United States Patent
Anderson et al.

(10) Patent No.: US 10,034,424 B2
(45) Date of Patent: *Jul. 31, 2018

(54) CROP ATTRIBUTE SENSING WITH CROP LOSS INHIBITORS

(71) Applicant: Deere & Company, Moline, IL (US)

(72) Inventors: Noel W. Anderson, Fargo, ND (US); Michael L. Rhodes, Richfield, MN (US); Andy C. Locken, Denver, CO (US); Gurmukh H. Advani, West Fargo, ND (US); Kevin P. Cowles, Fargo, ND (US)

(73) Assignee: Deere & Company, Moline, IL (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/163,014

(22) Filed: May 24, 2016

(65) Prior Publication Data

US 2017/0339827 A1 Nov. 30, 2017

(51) Int. Cl.
| | | |
|---|---|---|
| *A01D 41/127* | (2006.01) | |
| *A01D 45/02* | (2006.01) | |
| *A01D 41/06* | (2006.01) | |
| *A01D 63/00* | (2006.01) | |

(52) U.S. Cl.
CPC ......... *A01D 41/1273* (2013.01); *A01D 41/06* (2013.01); *A01D 41/1271* (2013.01); *A01D 45/021* (2013.01); *A01D 45/023* (2013.01); *A01D 45/025* (2013.01); *A01D 63/00* (2013.01)

(58) Field of Classification Search
CPC ...... A01D 41/127; A01D 41/06; A01D 45/02; A01D 45/021; A01D 41/1271; A01D 41/1273; A01D 45/023; A01D 45/025
USPC .......................... 56/10.2 C, 10.2 R; 460/1, 6
See application file for complete search history.

(56) References Cited

U.S. PATENT DOCUMENTS

| | | | |
|---|---|---|---|
| 3,991,618 A | * | 11/1976 | Stampfer ............. A01B 69/008 33/DIG. 13 |
| 4,166,349 A | | 9/1979 | Coenenberg et al. |
| 4,923,057 A | | 5/1990 | Carlson et al. |
| 5,568,405 A | | 10/1996 | Easton et al. |
| 5,607,996 A | | 3/1997 | Nichols et al. |

(Continued)

FOREIGN PATENT DOCUMENTS

WO 2013078328 A2 5/2013

OTHER PUBLICATIONS https://web.archive.org/web/20101220050919/http://minnesotainventorscongress.org/Portals/0/docs/19680%20CornShield.pdf. Accessed May 27, 2016. 1 page.

(Continued)

*Primary Examiner* — John Weiss
(74) *Attorney, Agent, or Firm* — Joseph R. Kelly; Kelly, Holt, Christenson PLLC

(57) ABSTRACT

A harvesting machine has a controlled subsystem that performs harvesting machine functionality, and a control system that controls the controlled subsystem. A header is mounted to the harvesting machine and has row dividers (that divide rows of crop stalks) and gathering chains. A set of crop loss inhibitors is mounted proximate a forward portion of each of the gathering chains, in a direction of travel of the harvesting machine. The crop loss inhibitors also include a sensor that senses a variable, indicative of a crop attribute, as each crop stalk passes through the set of crop loss inhibitors.

22 Claims, 16 Drawing Sheets

(56) References Cited

U.S. PATENT DOCUMENTS

| | | | |
|---|---|---|---|
| 5,790,428 A | | 8/1998 | Easton et al. |
| 6,073,427 A * | | 6/2000 | Nichols .............. A01D 41/1271 460/7 |
| 7,204,472 B2 | | 4/2007 | Jones et al. |
| 8,010,261 B2 * | | 8/2011 | Brubaker ........... A01D 41/1278 460/1 |
| 9,232,693 B2 * | | 1/2016 | Hendrickson ........ A01D 45/025 |
| 9,322,269 B2 | | 4/2016 | Sauder et al. |
| 9,322,629 B2 * | | 4/2016 | Sauder ................. A01D 45/021 |
| 2014/0236381 A1 | | 8/2014 | Anderson et al. |
| 2014/0331631 A1 | | 11/2014 | Sauder et al. |
| 2015/0029302 A1 | | 10/2015 | Acheson et al. |
| 2015/0293029 A1 * | | 10/2015 | Acheson ............ G01N 33/0098 356/51 |
| 2016/0106038 A1 * | | 4/2016 | Boyd .................. A01D 41/141 56/10.4 |
| 2016/0309656 A1 * | | 10/2016 | Wilken ................ A01D 41/127 |
| 2016/0330907 A1 * | | 11/2016 | Anderson .......... A01D 41/1278 |
| 2016/0338267 A1 * | | 11/2016 | Anderson ............ A01D 41/127 |
| 2017/0089742 A1 * | | 3/2017 | Bruns ................ A01D 41/1273 |
| 2017/0094901 A1 * | | 4/2017 | French, Jr. ........... A01D 41/127 |

OTHER PUBLICATIONS http://www.farmshow.com/a_article.php?submit_search=1&page=6&aid=7655&aid_previous=7640&aid_next=7669&page_num=6&nav_previous=&nav_next=1 Accessed May 27, 2016. 5 pages.

AbileneMachine http://www.abilenemachine.com/john-deere-combines-ear-saver-poly-am27178.html. 2 pages. Retrieved Feb. 19, 2016.

German Search Report for Application No. 10 2017 203 950.7 dated Oct. 20, 2017. 12 pages.

* cited by examiner

US 10,034,424 B2

CROP ATTRIBUTE SENSING WITH CROP LOSS INHIBITORS

FIELD OF THE DESCRIPTION

The present description relates to agricultural equipment. More specifically, the present description relates to sensing a crop attribute using a crop loss inhibitor on a harvesting machine.

BACKGROUND

There are a wide variety of different types of agricultural machines. One type of agricultural machine is a combine harvester. A combine harvester can be used to harvest a variety of different types of crops, depending on, among other things, the type of header that is mounted on the harvester.

Some combine harvesters are fitted with a corn header for harvesting corn or a header for harvesting sunflowers, or a similar header. The present description will proceed with respect to the header being a corn header, but it could be another header as well.

The corn header has, at its front end, a plurality of row dividers that separate the corn rows from one another and act to guide cornstalks back to a gathering chain that assists in moving the cornstalk to a mechanism (such as a snapping roller) that separates ears of corn from the cornstalk, itself. The ears of corn are then moved to a feeder house where they are moved rearward toward the grain processing subsystem in the harvester.

It can happen that, after the ears are separated from the stalk, but before they enter the feeder house, they bounce forward and land on the ground in front of the header. The harvester then passes over the ear. This results in the grain on the ear being lost because the harvester never processes it.

Therefore, some corn headers are fitted with ear loss inhibitors (or sometimes referred to as "ear savers") that are mounted to the row dividers at the forward end of the gathering chain, in the direction of travel of the combine harvester. The ear loss inhibitors are often formed as flaps that allow the cornstalk to move between them as the harvester engages the stalk, but inhibit any ears of corn, that have been separated from the cornstalk, from falling forward and then under the header.

Other corn headers have been fitted with probes or fingers that are mounted on the snout (i.e., the leading edge) of the row dividers, or closely proximate the snout of the row dividers. Such probes can be arranged as fingers or wires or other sensors that sense crop characteristics.

The discussion above is merely provided for general background information and is not intended to be used as an aid in determining the scope of the claimed subject matter.

SUMMARY

A harvesting machine has a controlled subsystem that performs harvesting machine functionality, and a control system that controls the controlled subsystem. A header is mounted to the harvesting machine and has row dividers (that divide rows of crop stalks) and gathering chains. A set of crop loss inhibitors is mounted proximate a forward portion of each of the gathering chains, in a direction of travel of the harvesting machine. The crop loss inhibitors also include a sensor that senses a variable, indicative of a crop attribute, as each crop stalk passes through the set of crop loss inhibitors.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
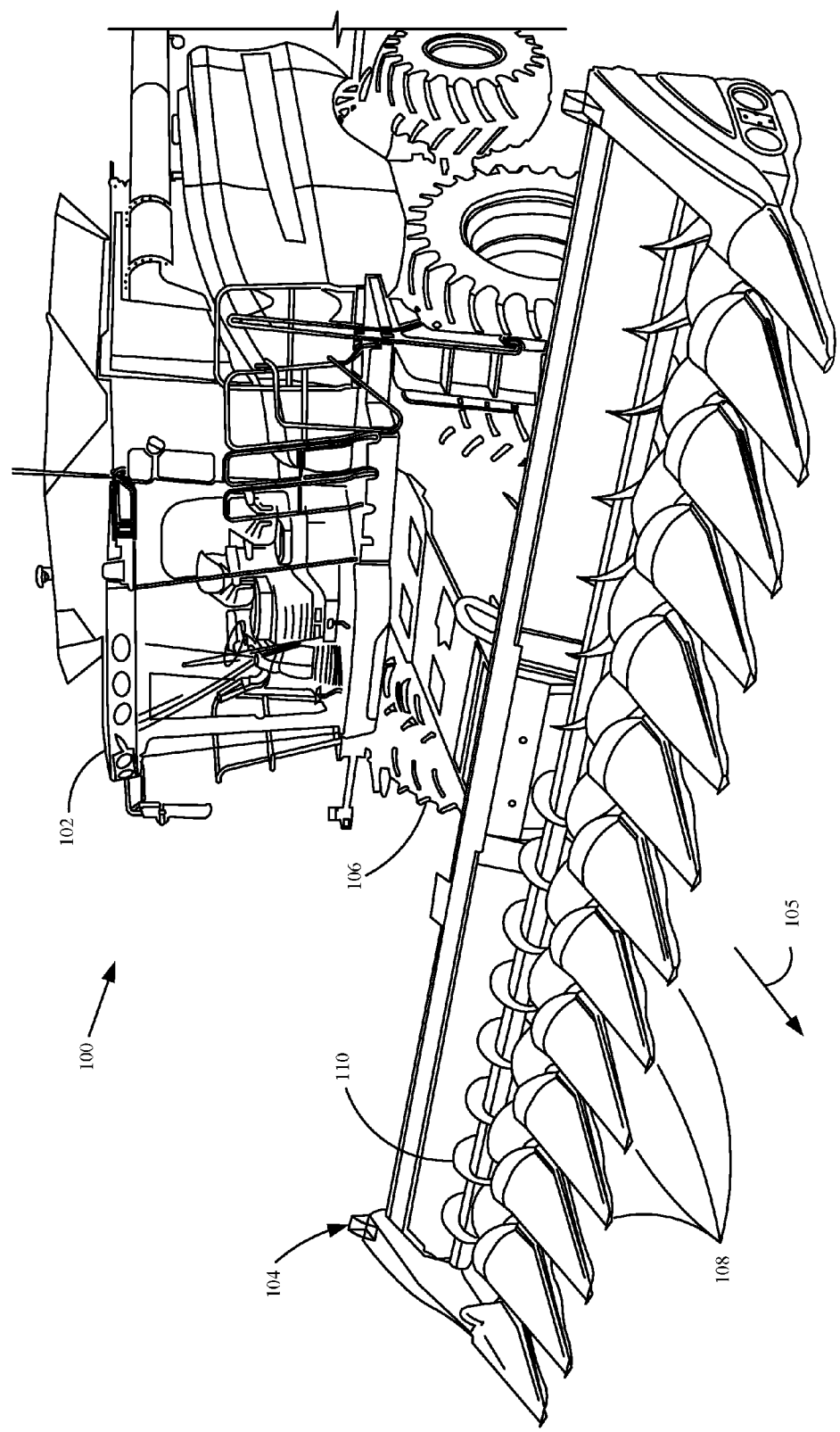
FIG. 1 is a pictorial illustration of a combine harvester.

FIG. 1 is a pictorial illustration of one example of a combine harvester (or harvester or harvesting machine) 100. Harvester 100 illustratively includes an operator compartment 102 and it is shown with a corn header 104 affixed thereto. It will be noted that it could have a header configured to harvest sunflowers or other crops, but the present discussion proceeds with respect to a corn header 104, for the sake of example.

As harvester 100 moves in a direction of travel indicated by arrow 105, corn header 104 engages corn crops and separates the ears of corn from stalks and feeds the ears through feeder house 106, back to other crop processing functionality in harvester 100. Header 104 illustratively includes a plurality of row dividers 108 that travel between the corn rows and help to divide the rows from one another. Stalks travel rearwardly between row dividers 108 where they are engaged by gathering chains (shown in more detail in later figures) and by a mechanism (such as a snapping roller) that separates the ears of corn from the cornstalks. The ears are then fed backward toward auger 110 which moves the ears of corn to a central area of header 104 where they are fed into feeder house 106.

Figure 2:
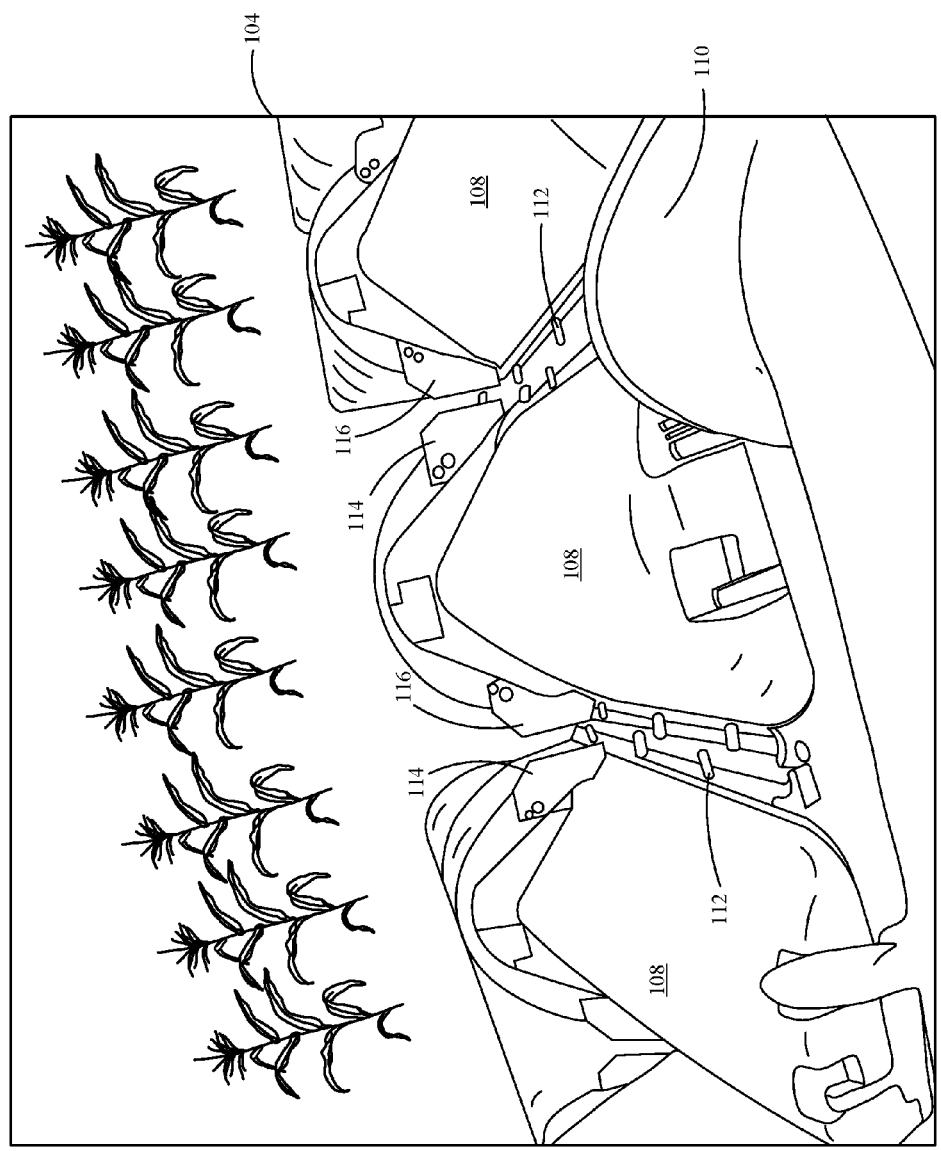
FIG. 2 is a pictorial illustration of a corn header on a combine harvester, with ear loss inhibitors and crop attribute sensors.

It can happen that, after ears of corn are separated from the stalks, they bounce forward (generally in the direction of travel indicated by arrow 105), off of header 104 and onto the ground. This results in harvester 100 passing over the ears of corn so that they are never processed, and the grain on those ears of corn is lost. FIG. 2 thus shows another view of harvester 100, in which similar items to those shown in FIG. 1 are similarly numbered. FIG. 2 is taken generally in a direction from behind header 104 and looking forward (in the direction of travel 105). It can be seen in FIG. 2 that adjacent crop dividers 108 have a gathering chain 112, disposed therebetween. As the header 104 engages the stalks of corn, gathering chains 112 assist the stalks in traveling backward toward feeder house 106.

FIG. 2 also shows that each adjacent pair of row dividers 108 has a combination ear loss inhibitor and crop attribute sensor 114 and 116. These will be referred to herein as ear loss inhibitors 114 and 116 though they perform a dual role of inhibiting crop loss (such as the loss of ears of corn or sunflowers, etc.) and sensing a crop attribute. In the example shown in FIG. 2, as the cornstalks move rearward of ear loss inhibitors 114 and 116, the snapping roller (or another mechanism) removes the ears of corn from the stalks in the region where gathering chains 112 move. Thus, even if the ears of corn tend to bounce (for example if the harvester travels over uneven ground) once they are separated from the stalks, ear loss inhibitors 114 and 116 are arranged to inhibit those ears from bouncing forward, and onto the ground. Instead, they will often contact ear loss inhibitors 114 and 116 and remain in the area of gathering chain 112 so they are moved rearward toward auger 110, such that they can be processed by the harvester 100.

Figure 3:
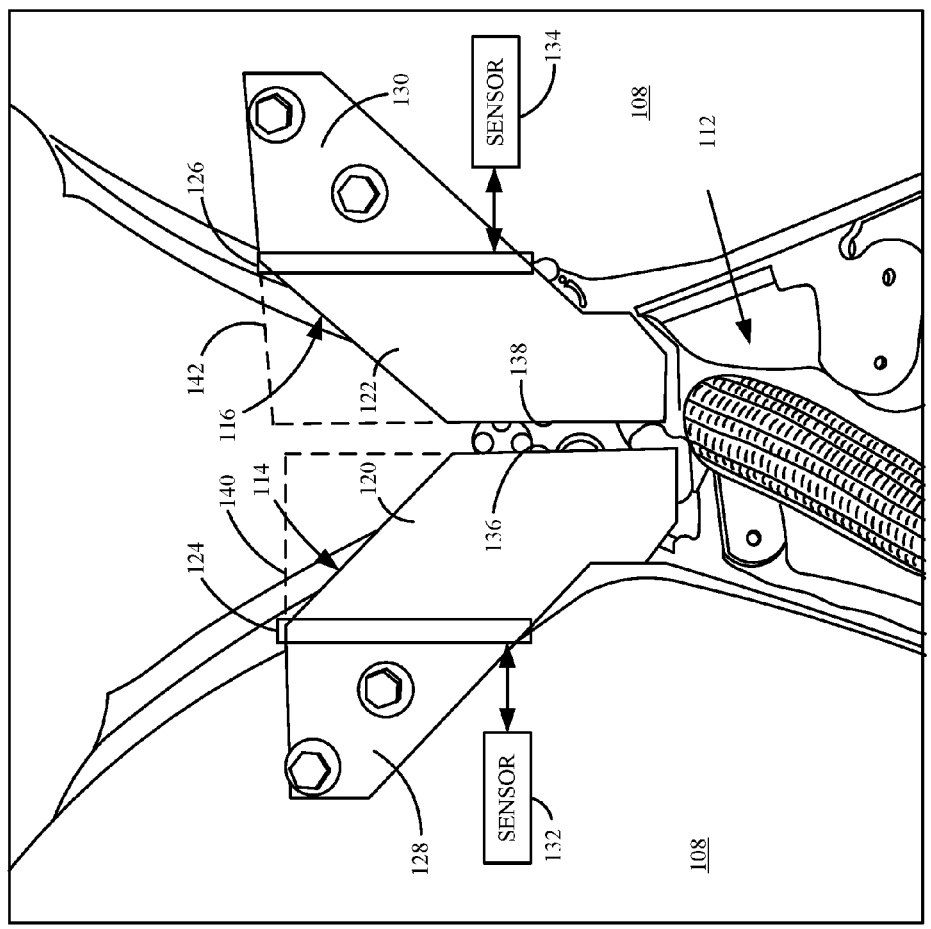
FIG. 3 is an enlarged pictorial illustration of a set of combined ear loss inhibitors and crop attribute sensors mounted on a pair of row dividers, closely proximate a forward portion of a gathering chain.

FIG. 3 shows an enlarged view of one example of ear loss inhibitors 114 and 116. Again, similar items to those shown in FIG. 2 are similarly numbered in FIG. 3. In the example shown in FIG. 3, each of the ear loss inhibitors 114 and 116 include a flap portion 120-122, a hinge portion 124-126 and a mounting portion (or row divider mount) 128-130, respectively.

Mounting portions 128-130 mount ear loss inhibitors 114-116 at a location rearwardly of the snouts (leading edge) of row dividers 108. In one example, they are mounted closely proximate (or even with) the front or leading part of the gathering chains 112. They may also be mounted slightly behind (or rearward of) the front part of gathering chains 112. All of these arrangements are contemplated herein.

In operation, as harvester 100 engages a corn stalk, it passes between row dividers 108, and engages the flap portions 120 and 122 of ear loss inhibitors 114-116 and displaces them, about hinge portions 124 and 126, generally rearward. FIG. 3 also schematically illustrates that ear loss inhibitors 114-116 has corresponding sensors 132-134. As flap portions 120 and 122 are displaced rearwardly about hinge portions 124 and 126, sensors 132 and 134 sense a variable indicative of that displacement and generate a sensor signal indicative of that displacement. The sensor signals may thus be indicative of a crop attribute. For instance, by sensing the deflection of flap portions 120 and 122, the sensor signals generated by sensors 132 and 134 give an indication of a diameter of the corn stalk that passes between them. The stalk diameter may be indicative of yield or another crop attribute.

It should also be noted that the example illustrated in FIG. 3 is only one example. Sensors 132 and 134 can also be a wide variety of different types of sensors and they can be located in a wide variety of different positions relative to flap portions 120 and 122. For example, they can be angle encoders that generate a signal indicative of the angle of deflection of flap portions 120 and 122. They can be resistive sensors or a wide variety of other sensors, some of which are described in greater detail below with respect to the remaining figures.

Further, the physical configuration of ear loss inhibitors 114 and 116 shown in FIG. 3 is an example as well. Other configurations can be used. For instance, it can be seen in FIG. 3 that the upper periphery of flap portions 120 and 122 extend generally downward and toward one another, ending at elongate, displaceable crop engaging sides (or distal edges) 136 and 138, respectively. The distal edges 136 and 138 are generally opposite mounting portions, 128 and 130 of flap portions 120 and 122. The distal edges are generally vertical and are generally parallel to an elongate axis defined by a crop stalk that engages the flap portions 120 and 122. The distal edges 136 and 138 are also illustratively parallel with one another and form a gap therebetween. As is described in greater detail below, the width of the gap can be varied as well. In addition, instead of having an upper periphery that extends generally downward and toward one another as shown in FIG. 3, flap portions 114 and 116 may have an upper periphery that extends generally horizontally, and toward one another, as indicated by dashed lines 140-142. Further, the height of the distal edges 136 and 138 of flap portions 120 and 122 (e.g., the distance from the lower ends of the edges of flap portions 120 and 122 adjacent gathering chain 112, to the opposite, upper end of edges 136 and 138) is illustratively sufficient so it inhibits ears of corn (or sunflowers, etc.) from bouncing in a forward direction and over the top of flap portions 120 and 122. In one example, the height of the distal edges 136 and 138 exceeds the width of flap portions 120 and 122 (e.g., it exceeds the distance from hinge portions 124 and 126 to the corresponding distal edges 136 and 138, respectively). In another example, the height of distal edges 136 and 138 of flap portions 120 and 122 ranges between approximately 2 inches and approximately 10 inches. Of course, this range is given by way of example only, and a wide variety of other dimensions can be used as well.

Figure 4:
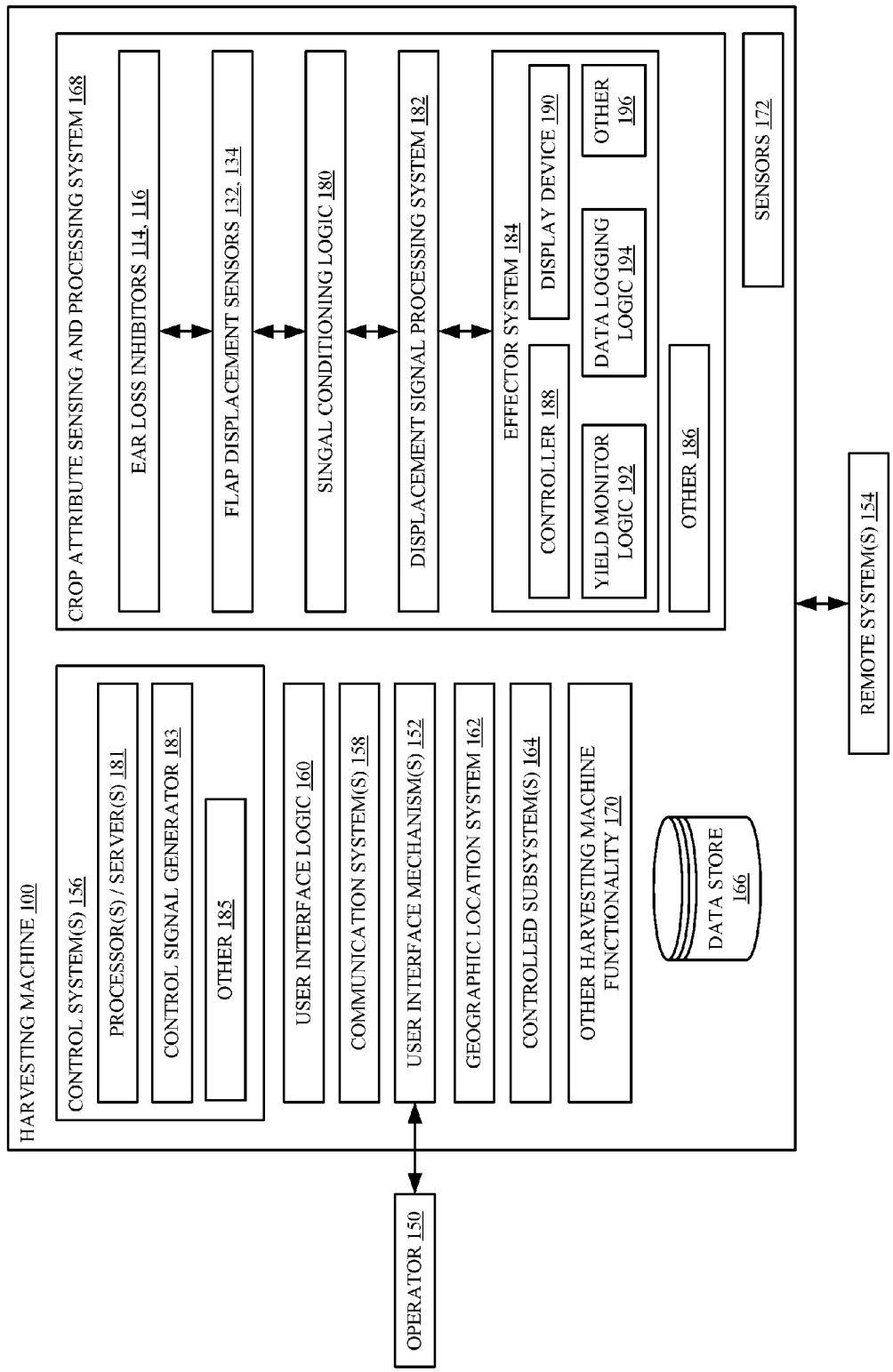
FIG. 4 is a block diagram of one example of a harvesting machine.

FIG. 4 is a block diagram of one example of harvesting machine 100. Harvesting machine 100 is shown in FIG. 4 being operated by operator 150. In one example, operator 150 interacts with user interface mechanisms 152 to control and manipulate harvesting machine 100. User interface mechanisms 152 can be a wide variety of mechanisms. For instance, they can include levers, pedals, buttons, joysticks, steering wheels, keypads, etc. In addition, harvesting machine 100 may have a display device that displays user actuatable display elements that the user can actuate to control and manipulate harvesting machine 100. The user actuatable display elements can include, for instance, icons, links, buttons, drop down menus, or a wide variety of other elements. Further, the user actuatable display elements can be actuated in a wide variety of different ways. They can be actuated using a point and click device (such as a mouse or trackball). Where the display device is a touch sensitive screen, they can be actuated using touch gestures. Further, where machine 100 has speech recognition functionality, the user actuatable display elements can be actuated using speech or voice commands. These are examples only.

FIG. 4 also shows that, in one example, harvesting machine 100 can communicate with one or more remote systems 154. This can be done over a network, using wireless communication or wired communication, using store and forward technology, or using a wide variety of other types of communication, some of which are described in greater detail below.

Harvesting machine 100 also illustratively includes one or more control systems 156, one or more communication systems 158, user interface logic 160, user interface mechanisms 152, and geographic location system 162. Machine 100 can also include one or more controlled subsystems 164, data store 166 and crop attribute sensing and processing system 168. It can include a wide variety of other harvesting machine functionality 170, and a variety of different sensors 172. Control system 156 illustratively includes one or more processors or servers 181, control signal generator 183, and it can include a wide variety of other items 185. Control system 156 can receive sensor signals from sensors 172 (and also from crop attribute sensing and processing system 168) and processors or servers 181 can process those signals. It can use control signal generator 183 to generate control signals that are used to control system 168 and controlled subsystems 164. User interface logic 160 can illustratively be used to generate outputs and receive user inputs through user interface mechanisms 152. Control system 156 can receive user inputs in this way as well. Control signal generator 183 can also generate control signals based on the user inputs.

Controlled subsystems 164 can include a wide variety of subsystems. For instance, they can include a propulsion subsystem, a grain transport subsystem, one or more grain processing subsystems, a refuse handling subsystem, or a wide variety of different or additional subsystems. In one example, operator 150 and control system 156 can control one or more of those subsystems during operation of machine 100.

Crop attribute sensing and processing system 168 illustratively includes a set of ear loss inhibitors 114-116 for each pair of adjacent row dividers 100. System 168 also illustratively includes flap displacement sensors 132-134 for each ear loss inhibitor on machine 100. System 168 can also include signal conditioning logic 180, displacement signal processing system 182, effector system 184, and it can include other items 186. Effector system 184 can, itself, include a wide variety of different types of effectors, such as controller 188, display device 190, yield monitor logic 192, data logging logic 194, and it can include other effectors 196. Before describing the operation of crop attribute sensing and processing system 168 in more detail, a brief overview of some of the items in system 168 (which have not already been discussed), and their operation, will first be provided.

FIG. 4 shows that crop attribute sensing and processing system 168 includes ear loss inhibitors 114 and 116, as well as flap displacement sensors 132 and 134, which can be those described above with respect to FIG. 3. They are examples only, however, and other configurations for ear loss inhibitors 114 and 116, and other examples of sensors 132 and 134, are described in greater detail below. Sensors 132 and 134 illustratively generate a signal indicative of the displacement of the flap portions 120 and 122 of ear loss inhibitors 114 and 116.

In the example being discussed, the displacement of the flap portions of ear loss inhibitors 114 and 116 is indicative of the width (or diameter) of the cornstalk passing between inhibitors 114 and 116. Flap displacement sensors 132 and 134 thus provide signals indicative of that stalk width (or diameter).

Signal conditioning logic 180 can include a variety of different types of signal conditioning items. For instance, it can include filtering, normalizing, amplifying, or other conditioning logic. Logic 180 conditions the sensor signals provided by sensors 132-134 and provides them to displacement signal processing system 182. System 182 illustratively processes the sensor signals to generate a value or metric indicative of a crop attribute, based upon the sensor signals. It also illustratively generates an effector control signal that is provided to effector system 184. System 182 thus controls one or more effectors in effector system 184, based upon the crop attribute identified from the sensor signals.

In one example, system 182 provides the control signal to controller 188 (which can also be control system 156 or a separate controller) in order to control one or more different functions of harvesting machine 100. For instance, controller 188 may control any of the controlled subsystems 164 or other harvesting machine functionality 170, based upon the sensed crop attribute. As a specific example, assume that the crop attribute is yield. In that case, controller 188 may control controlled subsystems 164 or other harvesting machine functionality 170 to control the speed of harvesting machine 100 or to control grain processing settings based on the sensed yield, etc.

Where the control signal is used to control display device 190, the sensed crop attribute may be displayed, or a display can be generated based upon that attribute. For instance, where the attribute is yield, the absolute or relative yield across the harvesting machine header may be displayed.

The control signal from system 182 may also control yield monitor logic 192. In doing so, it may provide an indication of the sensed yield to yield monitor logic 192. Yield monitor logic 192 may use that sensed yield in order to allocate a portion of an aggregate yield back to a geographic region of the field being harvested. For instance, it may allocate a portion of the aggregate yield back to a segment of an individual row or a set of rows in the field. Yield monitor logic 192 can perform other functions as well.

The control signal may be provided to data logging logic 194 which logs data based on that signal. By way of example, if the control signal is indicative of the sensed crop attribute, then data logging logic 194 can log the sensed crop attribute along with a variety of other information, such as its corresponding geographic location, the current machine settings, the machine speed, or a wide variety of other information.

Figure 5:
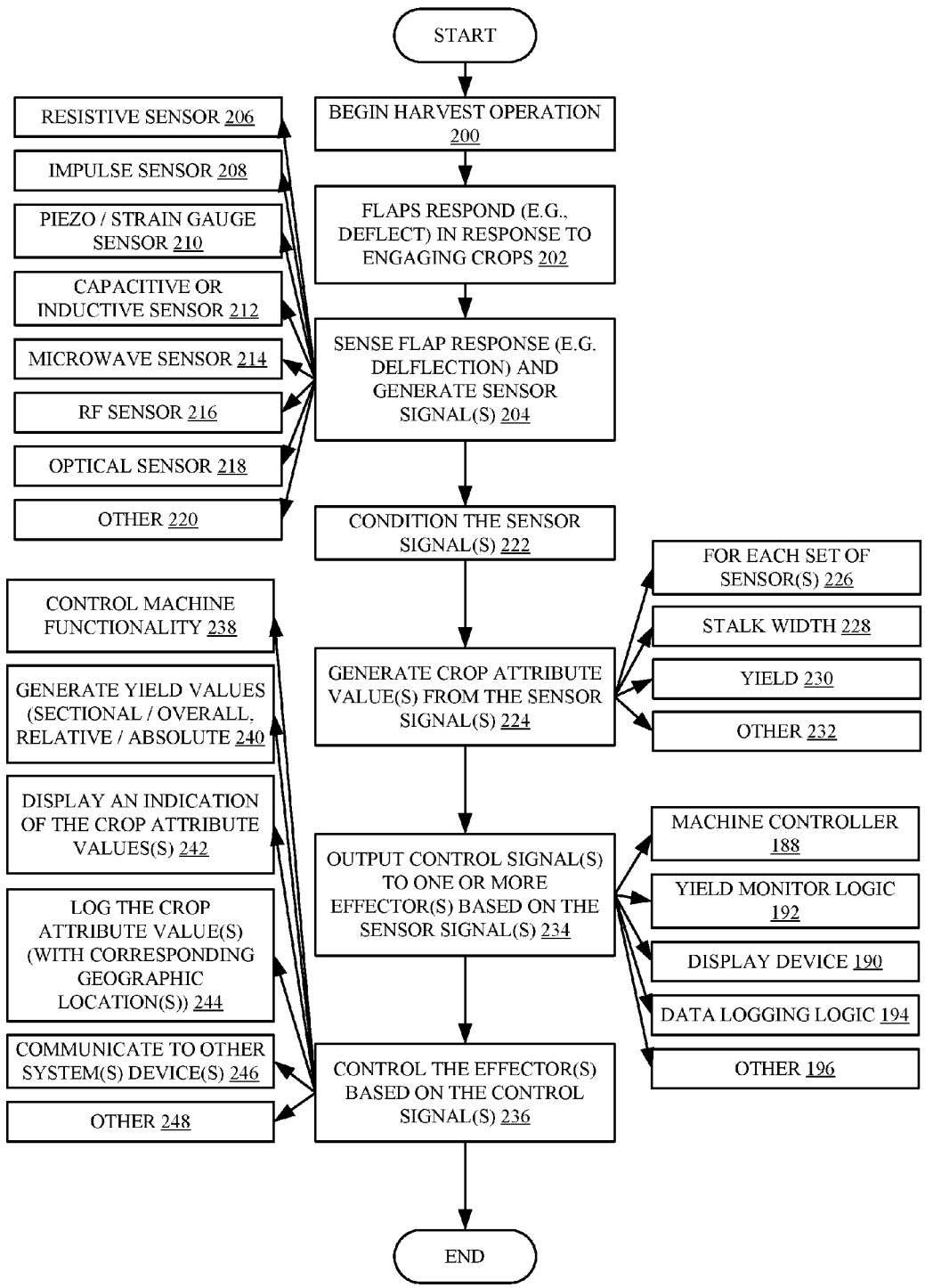
FIG. 5 is a flow diagram illustrating one example of the operation of the harvesting machine shown in FIG. 4, in sensing a crop attribute with the combined ear loss inhibitors and crop attribute sensors.

FIG. 5 is a flow diagram illustrating one example of the overall operation of crop attribute sensing and processing system 168, in an example in which the ear loss inhibitors 114 and 116 are embodied as those shown in FIGS. 2 and 3 (with flap portions 120 and 122, hinge portions 124 and 126, and flap displacement sensors 132 and 134). It will be noted that this is only one example of the operation of system 168, and a wide variety of other inhibitor configurations, sensors, etc., can be used.

It is first assumed that harvesting machine 100 is performing a harvesting operation. This is indicated by block 200 in FIG. 5.

As harvesting machine 100 engages the crop to be harvested, the flap portions 120 and 122 on ear loss inhibitors 114-116 respond to engagement with the crops. For instance, in one example, they deflect (or pivot about hinges 124-126) as they engage a cornstalk. Responding to engaging the crops is indicated by block 202.

Sensors 132-134 then sense the flap response (e.g., the deflection) and generate one or more sensor signals indicative of that response. This is indicated by block 204. The sensors can take a wide variety of different forms. For instance, they can be resistive sensors 206 that have a resistance value that changes based upon the flap deflection. The sensors may be potentiometers that have a wiper coupled to flap portions 120-122 so that as they pivot about hinge portions 124-126, the wiper moves to change the resistance of the sensors.

Sensors 132-134 can be impulse sensors 208. Such sensors detect the magnitude of the contact between the stalk and the flap portions 120-122. The larger the stalk, the larger the impulse that will be sensed.

The sensors can be piezo or strain gauge sensors 210. The piezo or strain gauge sensors may be placed on flap portions 120-122 such that, as they are deformed through contact with the cornstalk, a property of the sensor (such as electrical resistance) changes in response to the deformation. The piezo or strain gauge sensors can be formed in a variety of different ways as well. For instance, they may be foil strain gauge sensors or semi-conductor strain gauge sensors (such as those formed with piezo resistors), fiber optic sensors which can be employed to measure strain along an optical fiber deployed on the flaps 120-122, or other sensors.

Sensors 132-134 can also be capacitive or inductive sensors 212. Such sensors have elements so that the capacitance or measured inductance changes as the distance between two portions of the sensor changes. Thus, the capacitance or inductance across the gap between the two flap portions 120-122 can be measured. As it changes, this may be indicative of the width of the cornstalk.

Sensors 132-134 can also be microwave sensors 214, radio frequency (RF) sensors 216, optical sensors 218, or other sensors 220. Microwave sensors 214 may include a microwave emitter and a microwave detector deployed on opposite sides, or the same side, of the gap formed by flaps 120-122. RF sensors 216 detect a change in electromagnetic properties of a volume forming a sensitive region located near the sensor. Such sensors can be arranged such that a volume that includes the gap formed by flap portions 120-122 is the sensitive region so that the stalk width can be sensed in that region. Optical sensors 218 can include an optical emitter and an optical detector deployed on opposite sides of the gap formed by flap portions 120 and 122. They can be used to detect the cornstalk, or properties of it (such as its width) as it passes through the gap. All of these and other sensors can be used.

Due to factors such as machine vibration, electrical interference, and the presence of extraneous vegetative matter like weeds, the signal from sensors 132 and 134 may have noise as well as signal components. Therefore, in one example, signal conditioning logic 180 conditions the signal (or signal conditioning can be performed by displacement signal processing system 182 as well). This is indicated by block 222 in FIG. 5. The signals are illustratively smoothed or otherwise filtered to produce filtered signals indicative of the displacements of flaps 120 and 122 relative to hinge portions 124 and 126. In one example, the filtering is performed by sampling the analog sensor signal and converting it into a digital value at periodic intervals. In other examples, the analog signal may be filtered with analog filtering circuits before being sampled and converted to a digital value. Such filtering methods can include, without limitation, averaging, median filtering, loss pass and notch filtering, among others.

Displacement signal processing system 182 then generates one or more crop attribute values based on the sensor signals. This is indicated by block 224 in FIG. 5. In one example, system 182 does this for each row of crops being harvested, for each section of a field, for each section on harvester 100, for each plant or set of plants, or at other levels of granularity. Thus, for each set of sensors that are disposed on the row dividers 108 of the header 104, the crop attribute values can be generated. This is indicated by block 226. In the present example, the crop attribute is the stalk width 228 of a cornstalk or other crop stalk. In another example, the crop attribute can be yield 230 or any other value 232 that is directly sensed, or that is derived from the sensed variable.

System 182 then outputs a control signal to one or more effectors in effector system 184, based upon the sensor signals and/or the crop attribute value (if it is derived from or based on the sensor signals). This is indicated by block 234. As discussed above, the control signal can be provided to machine controller 188, yield monitor logic 192, display device 190, data logging logic 194, or any of a variety of other effectors 196 or different combinations of effectors.

System 182 thus controls the one or more effectors based upon the control signal. This is indicated by block 236 in FIG. 5. This can take a wide variety of forms as well. For instance, and again as mentioned above, system 182 can control the machine controller 188 in order to control the controlled subsystems 164 or other harvesting machine functionality 170. This is indicated by block 238 in the flow diagram of FIG. 5. System 182 or yield monitor logic 192 can generate yield values which can include sectional or overall yield values for machine 100. The values can be relative or absolute values, or they can be combinations of any of those or other values. Generating yield values is indicated by block 240 in FIG. 5.

System 182 can control display device 190 to display an indication of the crop attribute values or any other information based upon those values. This is indicated by block 242. Data logging logic 194 can log the crop attribute values with any other corresponding information such as the geographic location where those values were allocated, the rate of change of the values, machine settings when the values were sensed, etc. Logging this information is indicated by block 244 in FIG. 5.

It will also be noted that, in one example, system 168 can use communication system(s) 158 to communicate the information to remote systems 154 or other devices. This is indicated by block 246. For instance, it may be that remote systems 154 include a farm manager's computing system, an analysis system located in a remote server environment, a remote system used by a seed company, fertilizer company, or other organization, etc. In addition, system 168 can communicate the information to a mobile device used by operator 150, such as a device that operator 150 uses in the operator compartment of machine 100. Some examples of such devices are described below with respect to FIGS. 9-11.

Displacement signal processing system 182 can generate other or different control signals as well. Such control signals can be used to control a wide variety of other effectors 196. This is indicated by block 248 in the flow diagram of FIG. 5.

Figure 6:
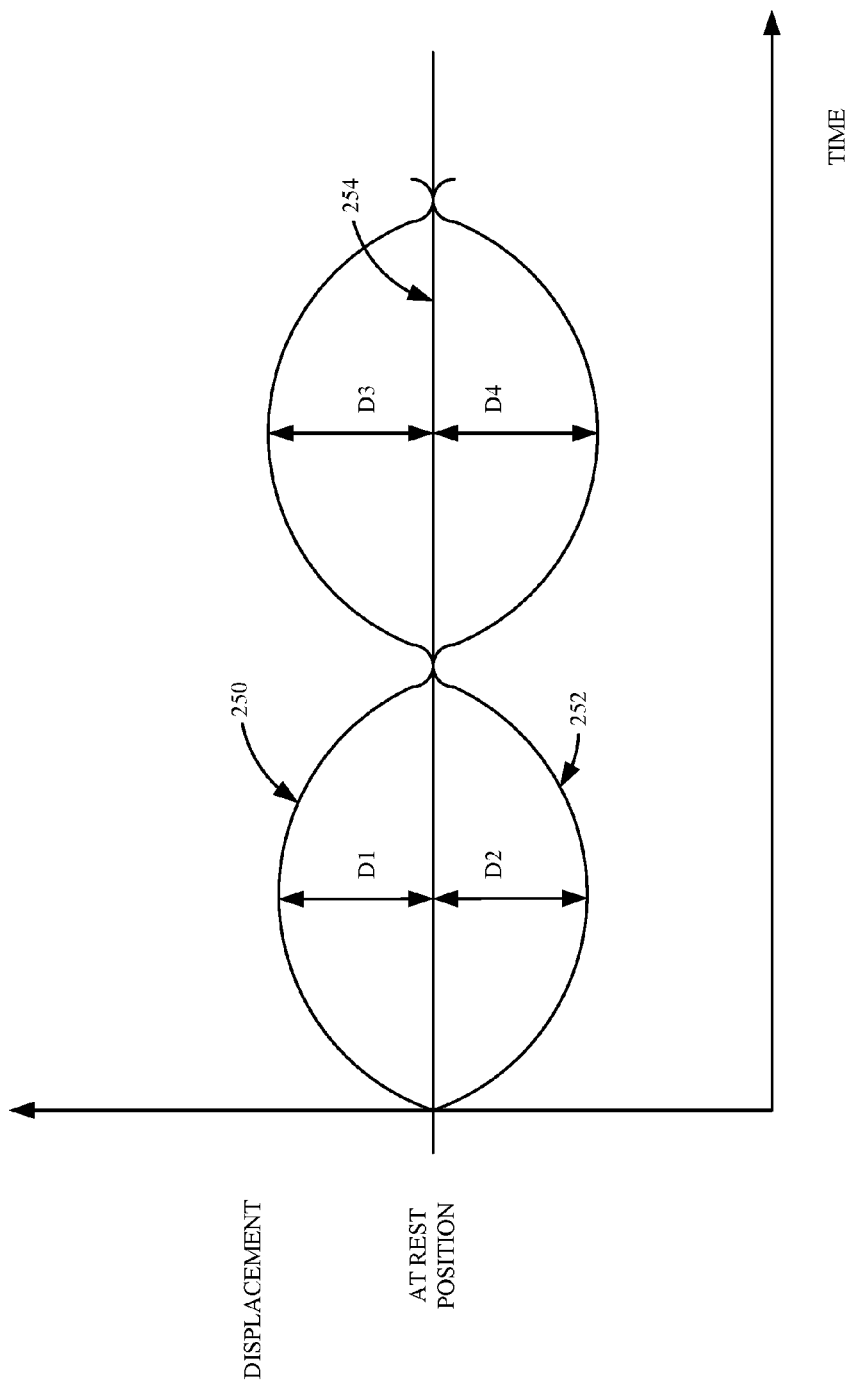
FIG. 6 is a graphical illustration of ear loss inhibitor displacement.

FIG. 6 shows one example of two different sensor signals 250 and 252 that may be generated by sensors 132 and 134, respectively, and that are indicative of the displacement of flap portions 120 and 122, as machine 100 moves through the field. In the example illustrated, signal 250 is generated by sensor 132, and signal 252 is generated by sensor 134. The axis 254 is illustratively representative of the at-rest position for flap portions 120-122 (i.e., when no stalk is passing between them). As a stalk engages flap portions 120 and 122, they begin to deflect so that the displacement signals 250 and 252 increase in their respective directions until they reach a maximum, at which point the stalk is between the two flap portions 120 and 122. The maximum displacement in signals 250 and 252 represents the diameter of the stalk passing between them. In the example shown in FIG. 6, the maximum displacement of flap portion 120, as a first stalk passes between the two flaps, is represented by displacement D1. The maximum displacement of flap portion 122 as the first stalk passes is represented by displacement D2. Therefore, the diameter of the stalk is represented by the value of D1+D2. After that, the stalk begins to pass rearward of flap portions 120 and 122, so that the flap portions begin to close and again move toward their at-rest position. Signals 250 and 252 thus decrease until the flaps are in their at-rest position, indicating that they are between stalks. As machine 100 continues to move through the field, another stalk is engaged by flap portions 120 and 122, at which point the flaps again begin to displace to a maximum displacement (represented by displacements D3 and D4 in FIG. 6), and the process repeats.

Figure 6A:
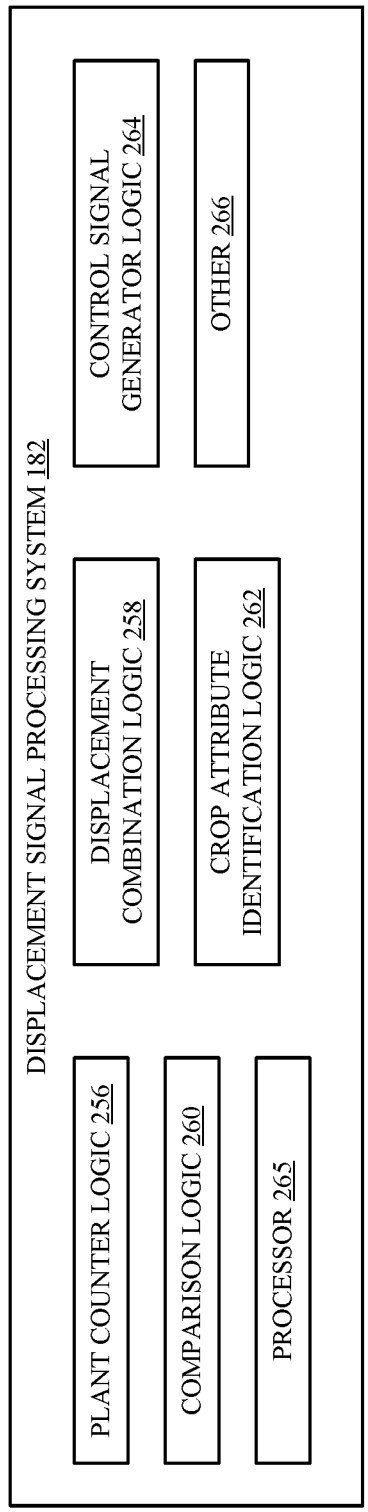
FIG. 6A is a block diagram of one example of a displacement signal processing system.

FIG. 6A shows one example of a more detailed block diagram of displacement signal processing system 182. In the example shown in FIG. 6A, system 182 illustratively includes plant counter logic 256, displacement combination logic 258, comparison logic 260, crop attribute identification logic 262, control signal generator logic 264, processor 265, and it can include a wide variety of other items 266.

Plant counter logic 256 counts the number of plants that are engaged by flap portions 120 and 122. This can be combined with the speed of harvester 100, or the distance traveled by harvester 100, to obtain a number of plants per linear distance. Displacement combination logic 258 combines the displacement signals from sensors 132 and 134 to obtain a combined displacement signal. Comparison logic 260 compares the signals so that a peak displacement can be identified.

Crop attribute identification logic 262 identifies the desired crop attribute, based upon the sensor signals and the values generated by the components of system 182. It can also identify the crop attribute in other ways as well. For instance, based on a sensed stalk diameter, and a number of stalks engaged per linear distance, crop attribute identification logic 262 may identify an estimated yield (sectional or aggregate yield, relative or absolute yield, etc.) based upon those values. By way of example, a relationship between those values and an estimated yield value may be included in mappings that map those values to estimated yield values. The mappings may be stored in data store 166 shown in FIG. 1, or elsewhere. In that case, crop attribute identification logic 262 can obtain the stalk diameter values and the number of stalks per linear distance in a given row, and access the mappings to identify an estimated yield based upon those values. This is only one example and crop attribute identification logic 262 can identify the crop attribute in a wide variety of other ways as well. It can calculate it dynamically, outsource the calculation to another component, etc.

Control signal generator logic 264 can generate the control signals to control effectors in effector system 184. This can be based upon the sensor signal or the identified crop attributes, for example.

Figure 7:
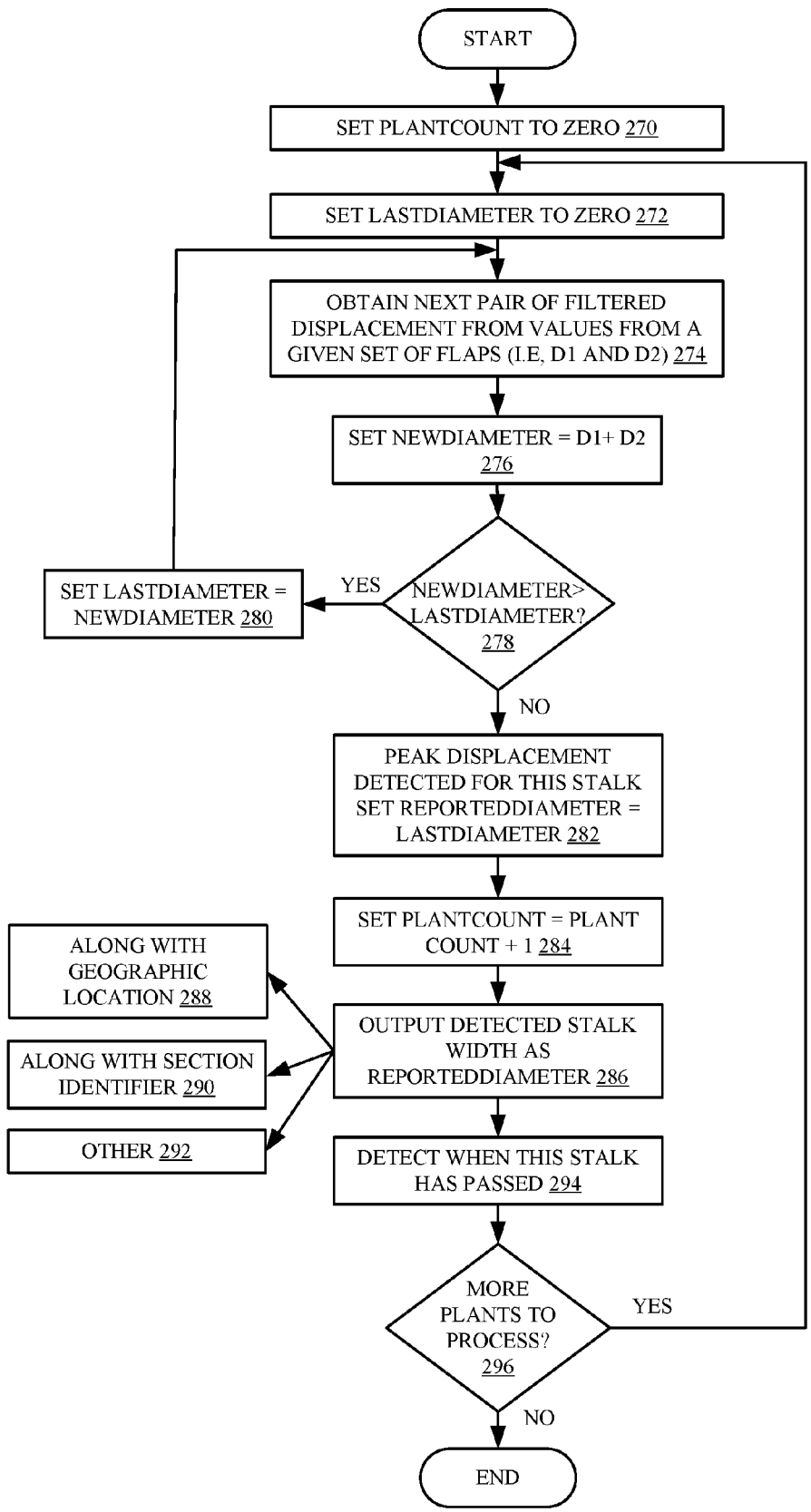
FIG. 7 is a flow diagram illustrating one example of the operation of a crop attribute sensing and processing system in generating a crop attribute value from a sensor signal.

FIG. 7 is a flow diagram illustrating one example of the operation of system 182 in generating a crop attribute value from the sensor signals. It will be noted that, in one example, the flow diagram illustrated in FIG. 7 will be executed for each set of flaps on a header of harvesting machine 100.

Before engaging any crop, plant counter logic 256 first sets a "PlantCount" value to zero, and processor 265 sets a value labeled "LastDiameter" to zero. This is indicated by blocks 270 and 272 in FIG. 7.

Displacement combination logic 258 then obtains filtered displacement values from the sensors 132 and 134, that are indicative of the displacement of flaps 120 and 122. The value of these signals is indicated herein as D1 and D2. This is indicated by block 274. Displacement combination logic 258 then combines those two values (such as by adding them) and sets a value "NewDiameter" to the value of D1+D2. This is indicated by block 276.

Comparison logic 260 then compares the NewDiameter value to the LastDiameter value to see whether the NewDiameter value exceeds the LastDiameter value. This is indicated by block 278. If not, that means that the displacement of the two flaps is either staying the same or is increasing. Thus, comparison logic 260 sets the LastDiameter value to the NewDiameter value and processing reverts to block 274 where another set of filtered displacement values is obtained. Setting the LastDiameter value equal to the NewDiameter value is indicated by block 280.

This process repeats itself until, at some point, the newly measured diameter (sensed by sensors 132 and 134) will be smaller than the previously measured diameter. This indicates that the stalk has passed between the two flap portions 120 and 122 and those two portions are beginning to close and return to their at-rest positions. In that case, the peak displacement of the two flap portions 120 and 122 will have been reached for a current stalk that is passing between the two flap portions, and a value ReportedDiameter will be set to the LastDiameter value. Thus, the ReportedDiameter value will be equivalent to the peak displacement of the two flaps, and will thus be representative of the sensed diameter of the cornstalk that has just passed between the two flap portions. Identifying that a peak displacement has been detected and setting the ReportedDiameter value to the LastDiameter value is indicated by block 282 in FIG. 7.

The PlantCount value will then be set to the previous value for PlantCount plus one. This is indicated by block 284.

Comparison logic 260 then outputs the detected stalk width (or stalk diameter) as the ReportedDiameter value. This is indicated by block 286. It can combine this value with the geographic location of the stalk where the value was detected. The geographic location can be indicated by geographic location system 162. Combining the two values (the stalk width or stalk diameter with its geographic location) is indicated by block 288. It can also be provided along with a section identifier that identifies the particular section of the header of harvesting machine 100 where the stalk was engaged. This is indicated by block 290. It can be provided along with a wide variety of other information as well, and this is indicated by block 292.

Displacement combination logic 258 and comparison logic 260 continue to operate until they sense that the present stalk has completely passed through the two flap portions 120 and 122, and those portions have returned to their at-rest position. This is indicated by block 294 in FIG. 7, and it is described in greater detail below with respect to FIG. 8.

If machine 100 is continuing to harvest in the field, that means that there are more plants to process by displacement signal processing system 182. Thus, processing reverts to block 272. This is indicated by block 296 in FIG. 7.

Figure 8:
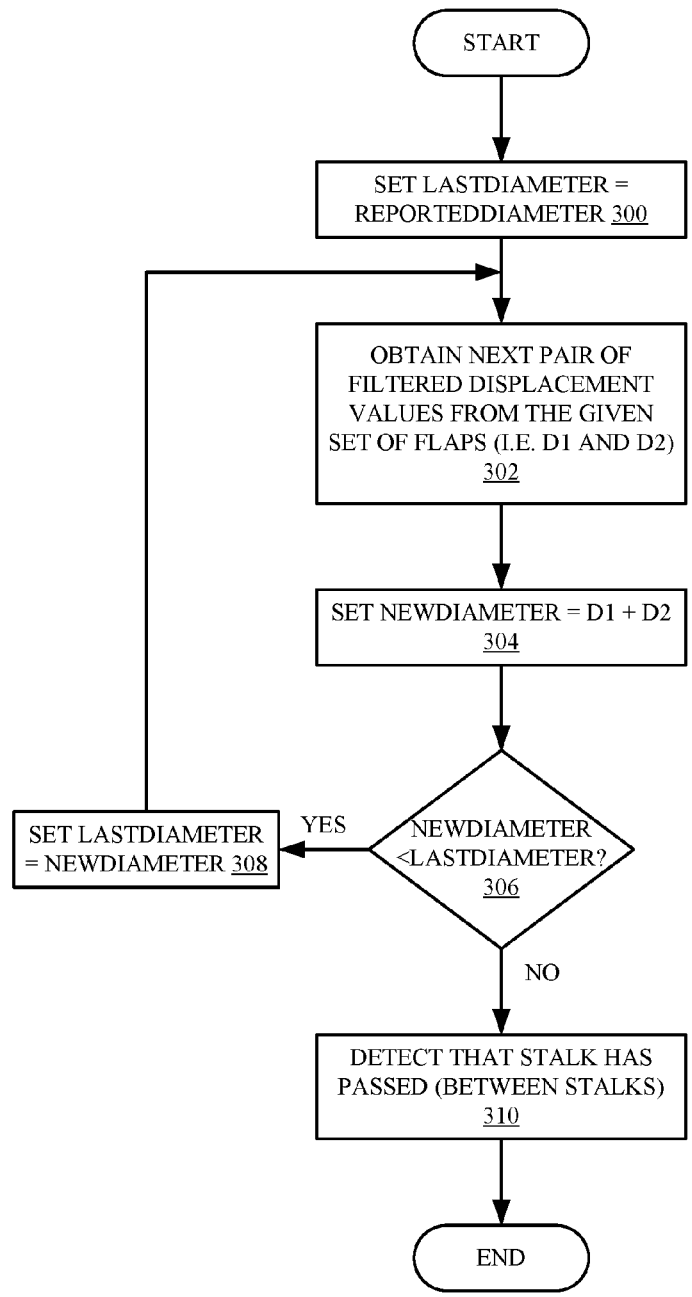
FIG. 8 is a flow diagram illustrating one example of the operation of the crop attribute sensing and processing system in determining when a stalk has passed, and when the sensor is between stalks in a row.

FIG. 8 is a flow diagram illustrating one example of the operation of displacement signal processing system 182 in identifying when a stalk has completely passed through the two flap portions 120 and 122. Processor 265 first sets the LastDiameter value to the ReportedDiameter value received from the processing described above with respect to FIG. 7. This is indicated by block 300 in FIG. 8. Logic 258 then obtains a next pair of filtered displacement values from the given sensors 132-134 (which sense displacement of flap portions 120-122), as displacement values D1 and D2. This is indicated by block 302. Displacement combination logic 258 then combines displacement values D1 and D2 and sets the NewDiameter value equal to D1+D2. This is indicated by block 304.

Comparison logic 260 then determines whether the NewDiameter value is less than the LastDiameter value. This is indicated by block 306. If so, this means that the cornstalk is still passing between the two flaps, and they are closing toward their at-rest position. Thus, comparison logic 260 sets the LastDiameter value to the NewDiameter value, as indicated by block 308, and processing returns to block 302 where displacement combination logic 258 again obtains another pair of filtered displacement values from the sensors 132-134.

This processing continues at blocks 302-308 until the NewDiameter value is no smaller than the LastDiameter value. This indicates that the flap portions 120-122 have returned to their at-rest position. Thus, processing continues at block 310, at which point comparison logic 260 detects that the stalk has completely passed the flap portions 120-122, and that they have now returned to their at-rest positions. This means that they are currently between stalks that are being harvested. Processing then reverts to block 202 in FIG. 5 where the flap portions 120-122 remain in their at-rest position until they engage the next stalk in the field.

Figure 9:
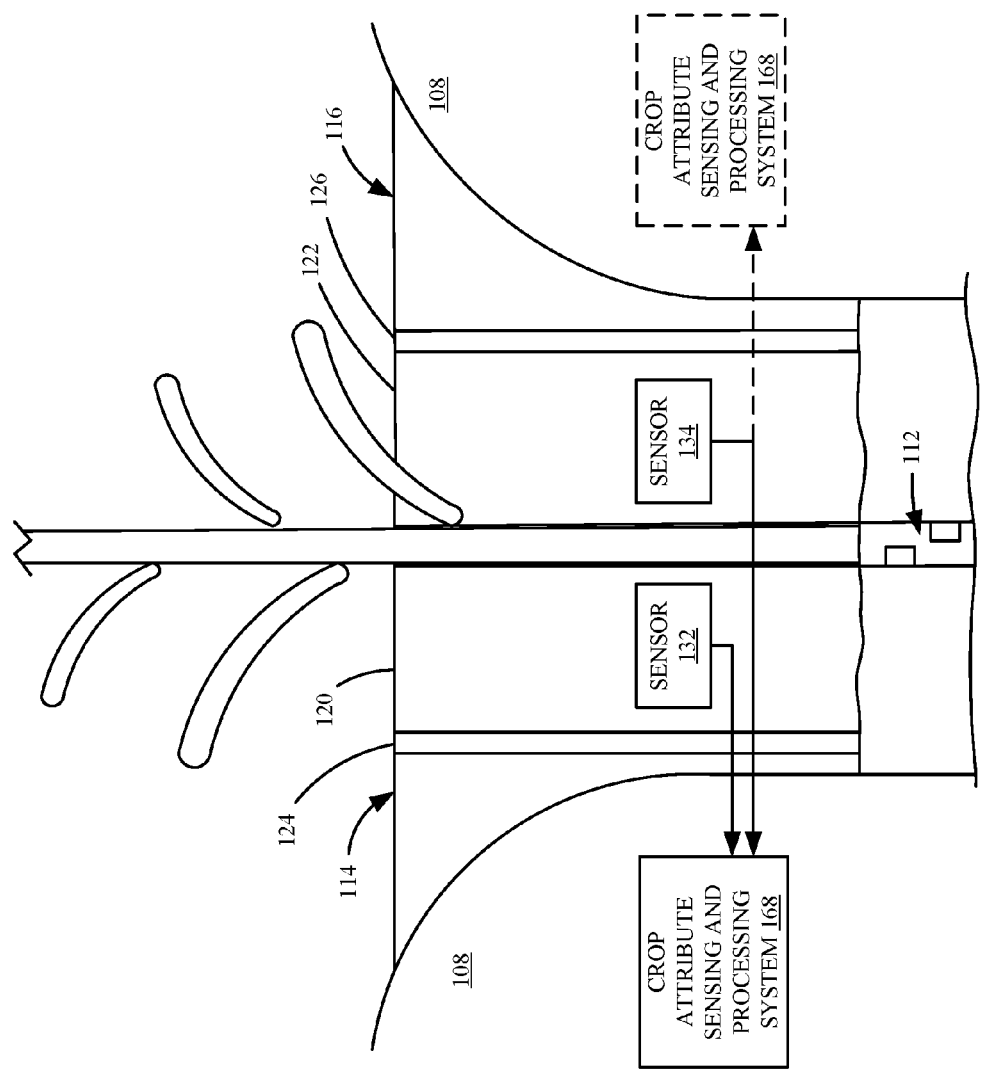
FIGS. 9 and 10 are partial block diagrams, partial pictorial illustrations, showing various examples of the placement of sensors and other components, relative to the ear loss inhibitors.
Figure 10:
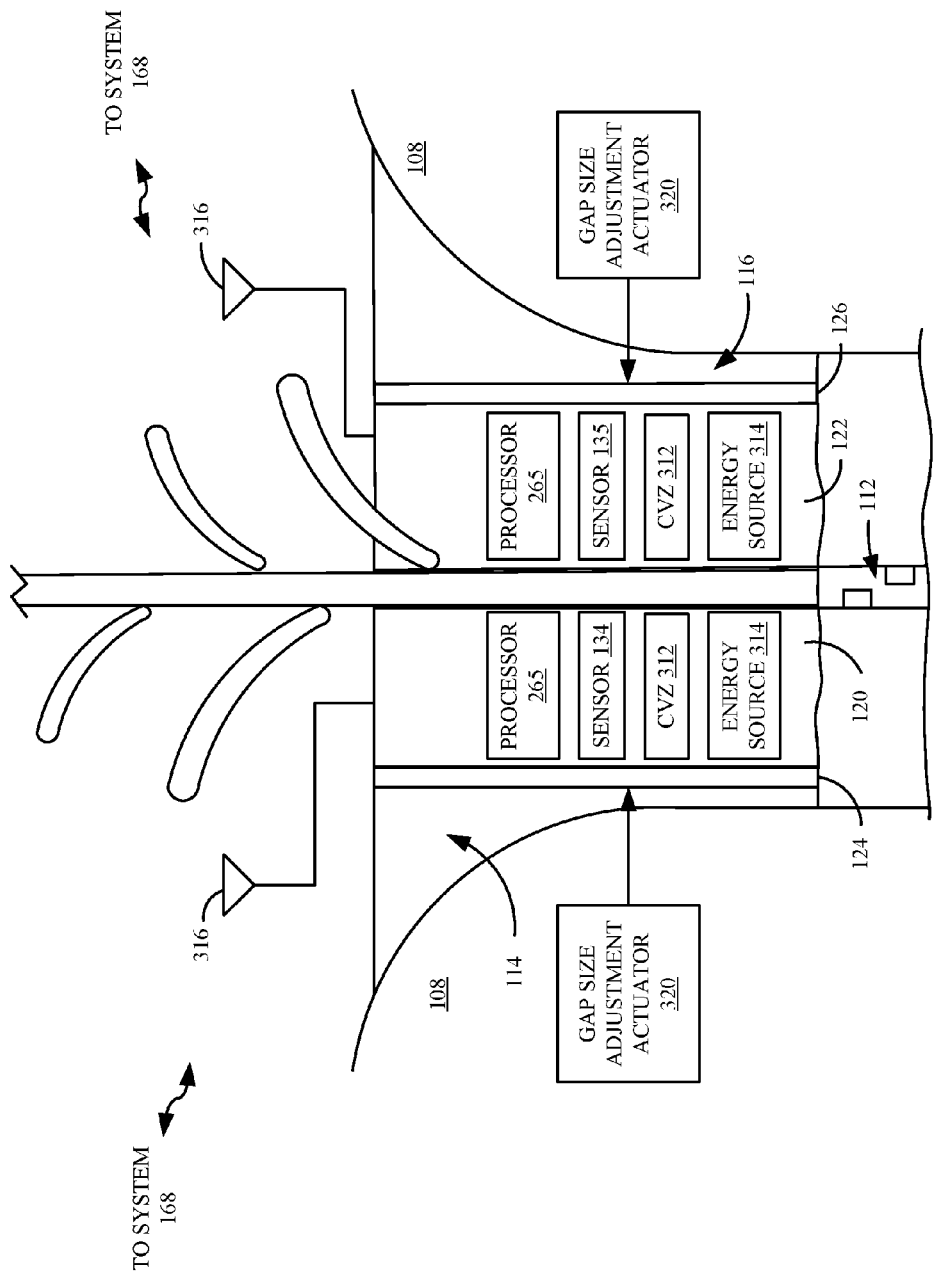

FIGS. 9 and 10 are partial pictorial, partial schematic views of different examples of ear loss inhibitors 114 and 116. Some of the elements shown in FIGS. 9 and 10 are similar to those shown in previous figures, and they are similarly numbered.

FIG. 9 shows that sensors 132 and 134 can be physically located directly on flap portions 120 and 122. They can both communicate with the remainder of crop attribute sensing and processing system 168 through various communication links. For example, the links can be wiring harnesses or other hardwired links, or they can be wireless links. Also, crop attribute sensing and processing system 168 (or various portions of it) can be located closely adjacent sensors 132 and 134 (such as on either or both of crop dividers 108) or system 168 can be located remotely from sensors 132 and 134. For instance, system 168 can be located either by itself or with other electronics in or near the operator compartment of machine 100, at a different location on header 104, or in a wide variety of other locations.

It one example in which a separate system 168 is located on each row divider 108, the corresponding sensor 132 or 134 may be coupled to the corresponding system 168 with a wire connection which need not cross the gap between flap portions 120 and 122. Similarly, a single crop attribute sensing and processing system 168 may be located at a position on a row divider 108 that can receive sensor signals from sensors on opposite sides of the row divider. All of these architectures are contemplated herein.

FIG. 10 shows yet another configuration for ear loss inhibitors 114 and 116, and crop attribute sensing and processing system 168. In the example illustrated in FIG. 10, flap portions 120 and 122 have not only sensors 132 and 134 physically mounted thereon, but they can have additional items as well. For instance, processor 265 (which can perform some or all of the processing for displacement signal processing system 182 or crop attribute sensing and processing system 168) can be located on either or both flap portions 120 and 122. Similarly, in the example shown in FIG. 10, flap portions 120 and 122 also illustratively have one or more controlled viscosity zones 312 deployed thereon, as well as one or more energy sources 314.

In such an example, flap portions 120 and 122 are generally formed of a pliable material, such as rubber. The stiffness of the rubber can be chosen so that flap portions 120 and 122 bend to accommodate a cornstalk, and return to their at-rest position sufficiently quickly that they accommodate corn seed spacings and harvest speeds for machine 100. In one example, this deflection and returning to the at-rest position may occur at approximately 15 Hz, at approximately 30 Hz or faster. Also, in one example, the material for flap portions 120 and 122 is chosen so that it performs in this way during normal harvesting temperatures (such as between −40° C. and +50° C., as an example).

Also, in some harvest environments, the plant stalk may be weak, or the corn ear (or similar harvested part of a plant, such as a flower on a sunflower plant) may be loosely attached. Therefore, the impact of the stalk with flap portions 120 and 122 may cause the ear (or other harvested part) to drop prematurely and fall under the harvester header, so that it will not be processed. Further, where the stalk is relatively pliable, or weak, the impact with flap portions 120-122 may cause the stalk or stem to bend, and pass underneath the header, instead of entering the header. Thus, flap portions 120-122 may have a relatively low deflection force, while maintaining accuracy and crop attribute sensing. In addition, they may be configured to deflect rearwardly (to receive the stalk) more easily than they deflect forwardly (so that ears are retained).

Further, the flexibility of the flap portions 120-122, in one example, may be adjustable in a number of different ways. In the example illustrated in FIG. 10, flap portions 120-122 each have a controlled viscosity zone 312. Zones 312 are formed to alter a physical property related to the stiffness of flap portions 120-122. This allows the plant impact, or flap response, to be adjusted. In one example, controlled viscosity zones 312 can be configured as electro-rheological or magneto-rheological materials under control of one or more processors 265.

FIG. 10 also shows that energy sources 314 can be provided on the flap portions 120-122, or in close proximity to them. Energy sources 314 may receive energy from harvesting machine 100 through wires. Alternatively, sources 314 may comprise other energy sources.

Also, in FIG. 10, each flap portion 120-122 has a corresponding communication mechanism 316. In the example shown in FIG. 10, communication mechanisms 316 are used to communicate with other components that are not resident on or near flap portions 120-122, and that are not otherwise connected for communication. For instance, where most of the crop attribute sensing and processing system 168 is disposed on or near flap portions 120-122, then communication mechanisms 316 may communicate with effectors 188-196. They can communicate with other items as well. Thus, communication mechanisms 316 may be dedicated or networked, wired communication mechanisms, or they may be wireless communication mechanisms that communicate over wireless communication links. All of these are contemplated herein.

Also, in one example, the gap between flap portions 120 and 122 may be varied for a variety of reasons, such as to alter the magnitude of the plant/flap impact as a plant engages flap portions 120-122. In general, the wider the gap between flap portions 120-122, the less they need to deflect and hence the less force is needed for the plant stalks or stems to pass through the flap portions 120-122. Widening the gap, however, may reduce detection of stalks or stems which are narrow. Further, widening the gap may reduce the ability to prevent ears from falling in front of the header. Therefore, in one example, the gap is adjustable by using gap size adjustment actuator 320. Actuator 320 may be a manual or automatic actuator.

It can thus be seen that flap portions 120-122 can serve multiple purposes. They can inhibit crop from bouncing forward of header 104 and not being processed by machine 100. Similarly, they can be used to sense a crop attribute of the crop being harvested. Also, flap portions 120-122 are relatively tall, or elongate, along edges 136-138. Thus, they tend to be more robust than sensors (such as wires or other narrow sensors) that may be used to sense stalk width or other attributes. Further, because the crop attribute sensing mechanisms are not located on the snout of the row dividers but are instead up and away from the soil, and located closely proximate the forward end of the gathering chain (either just behind the forward end of the gathering chain, at the forward end of the gathering chain, or just forward of the forward end of the gathering chain), they are less likely to be impaired by dirt, weeds, or other debris. Similarly, because they do not contact the plant until it is closely proximate the leading edge of the gathering chain, this location reduces the likelihood that engaging the stalk will induce premature ear or grain release from the stalk.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information generated on machine 100 can be output to the cloud or other remote server environment.

Figure 11:
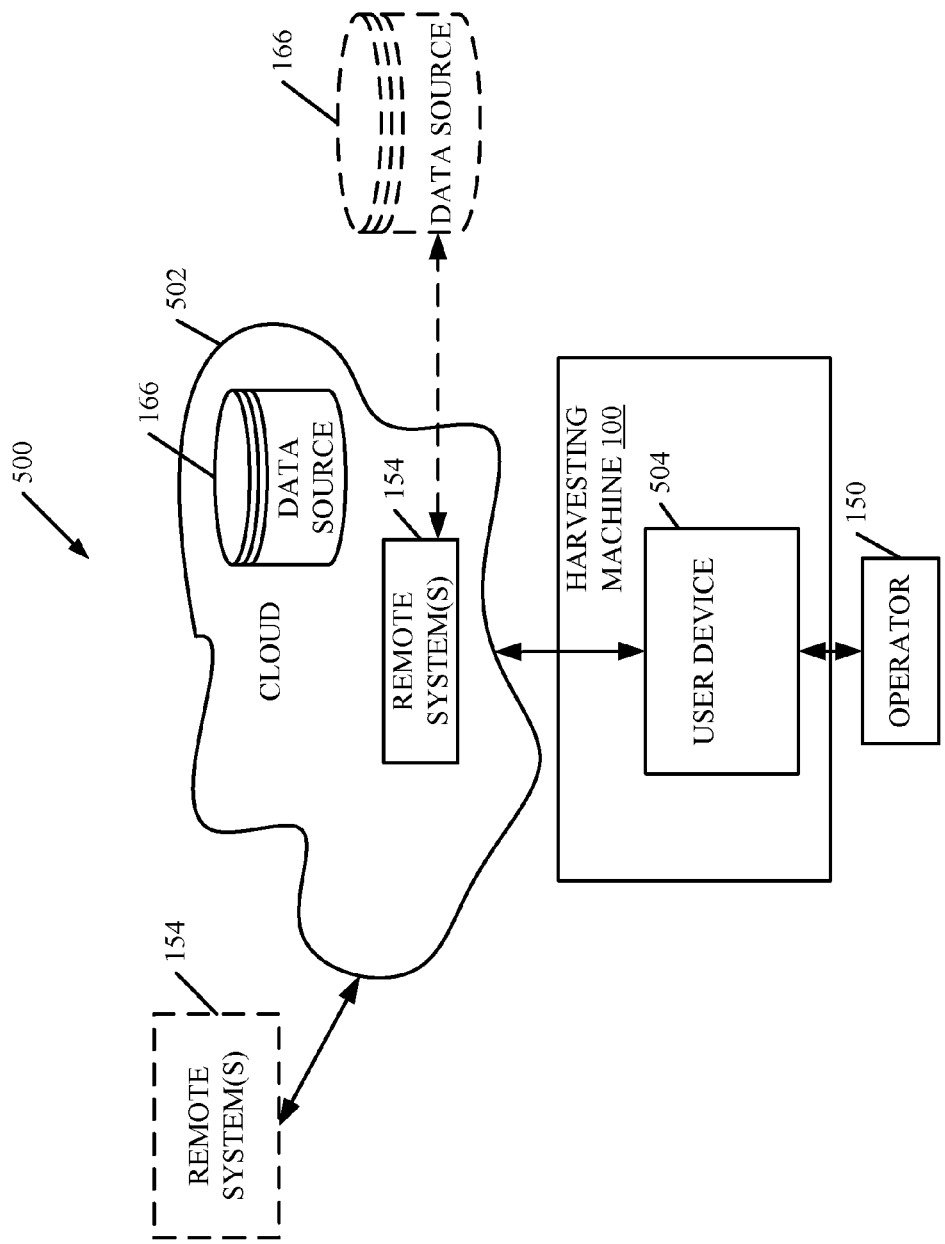
FIG. 11 is a block diagram showing the harvesting machine of FIG. 4, operably disposed in a remote server environment.

FIG. 11 is a block diagram of harvester 100, shown in FIGS. 1 and 4, except that it communicates with elements in a remote server architecture 500. In one example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 4 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 11, some items are similar to those shown in FIG. 4 and they are similarly numbered. FIG. 11 specifically shows that operator 150 can use a user device 504, and that remote systems 154 and data store 166 can be located at a remote server location 502. Therefore, harvester 100 accesses those systems through remote server location 502.

FIG. 11 also depicts another example of a remote server architecture. FIG. 11 shows that it is also contemplated that some elements of FIG. 4 are disposed at remote server location 502 while others are not. By way of example, remote systems 154 or data store 166 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester 100 comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
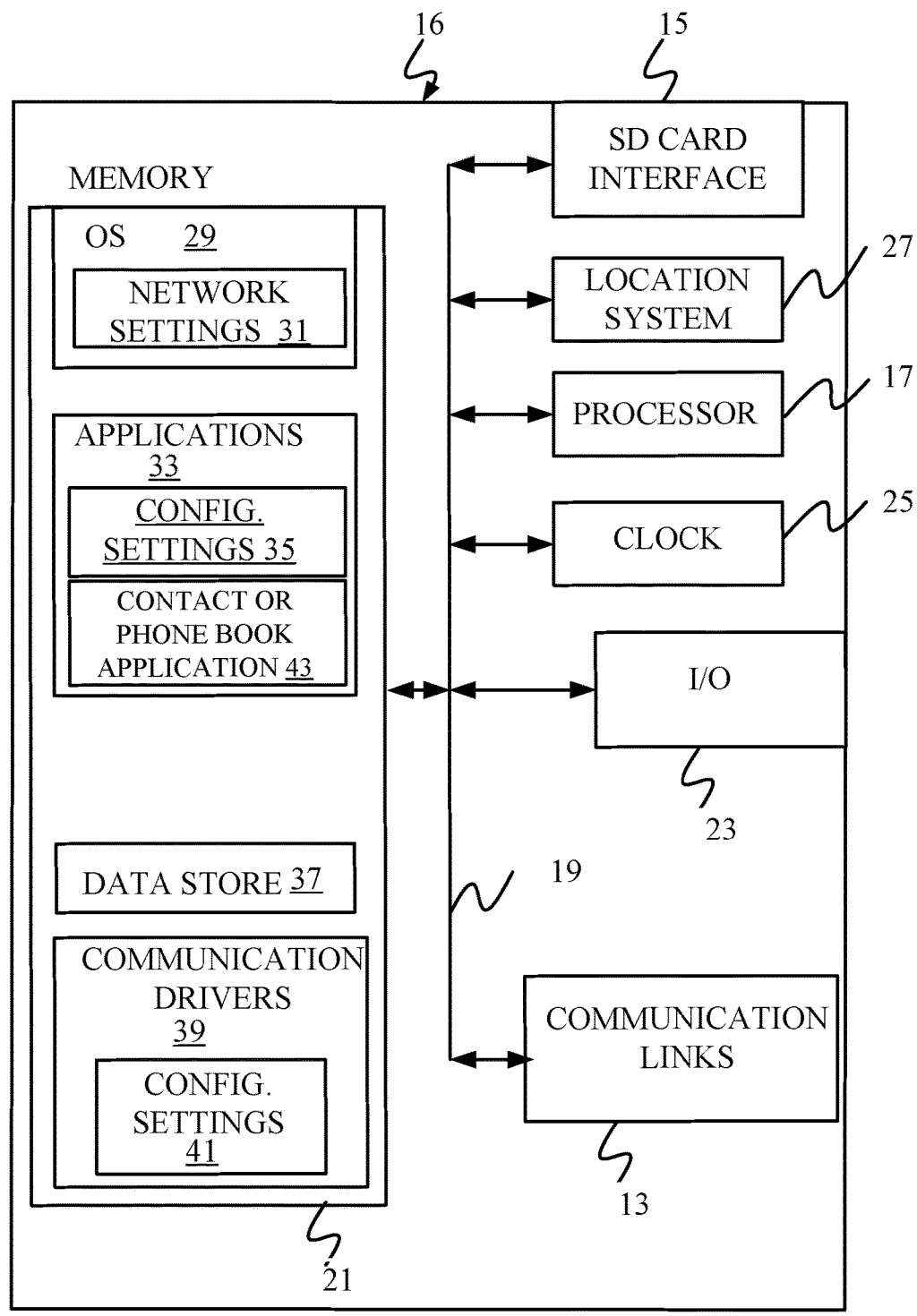
FIGS. 12-14 show examples of mobile devices that can be used in the architectures of the previous figures (such as used in the operating compartment of the harvesting machine, etc.).
Figure 13:
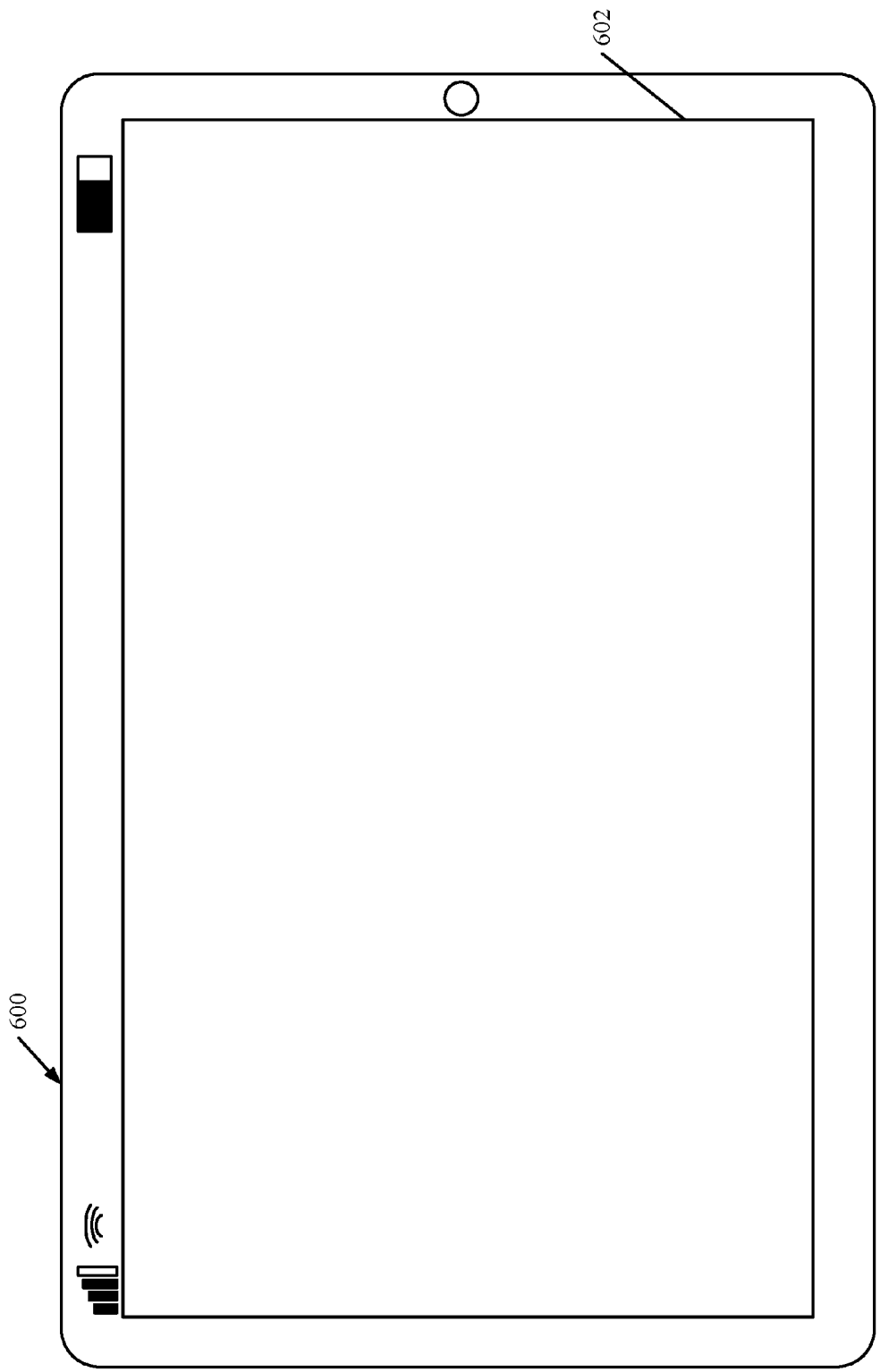
Figure 14:
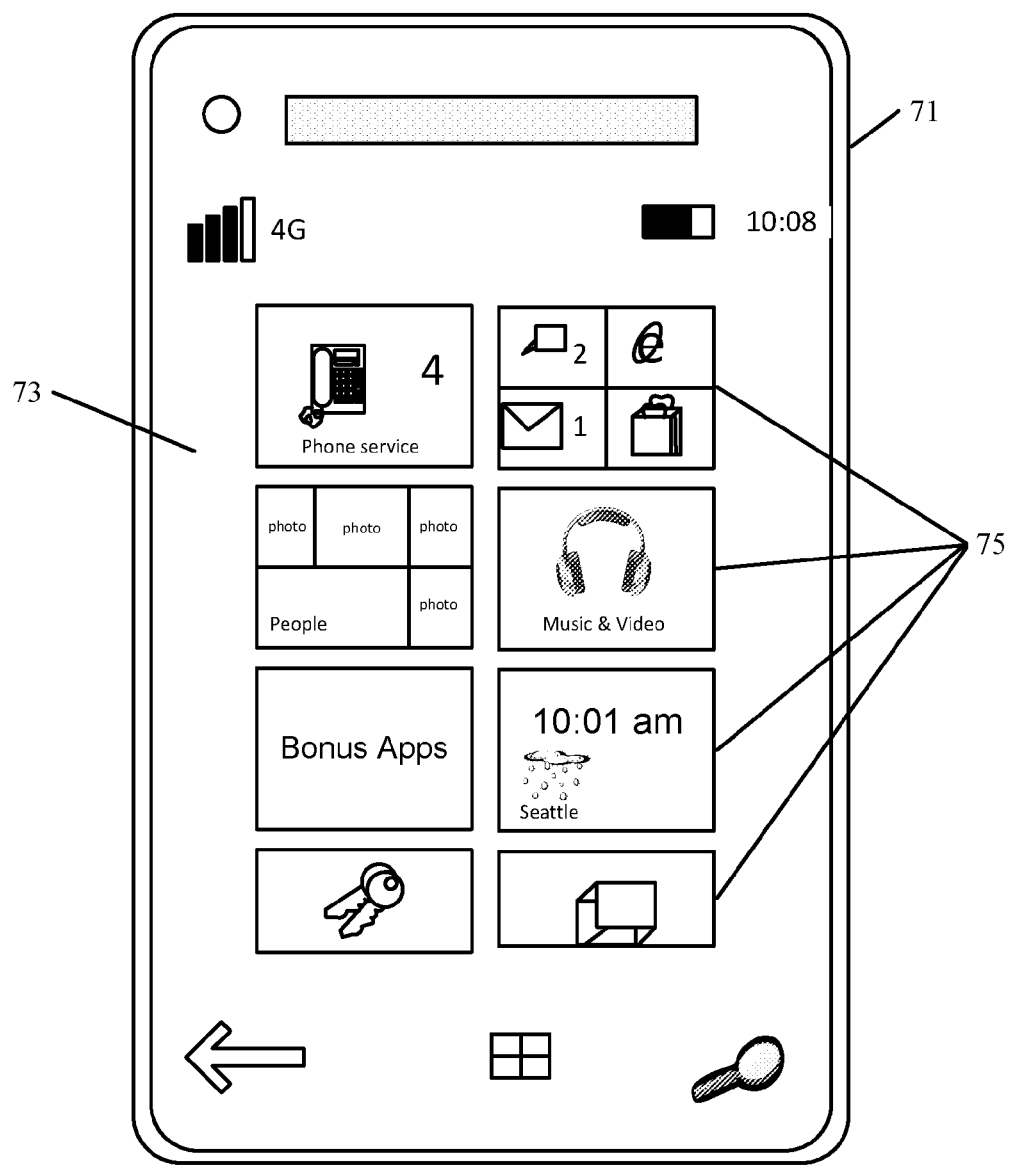

FIG. 12 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the crop attribute or other information. FIGS. 13-14 are examples of handheld or mobile devices.

FIG. 12 provides a general block diagram of the components of a client device 16 that can run some components shown in FIG. 4, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processor 180 from FIG. 4) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one example in which device 16 is a tablet computer 600. In FIG. 13, computer 600 is shown with user interface display screen 602. Screen 602 can be a touch screen or a pen-enabled interface that receives inputs from a user's finger, a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 14 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
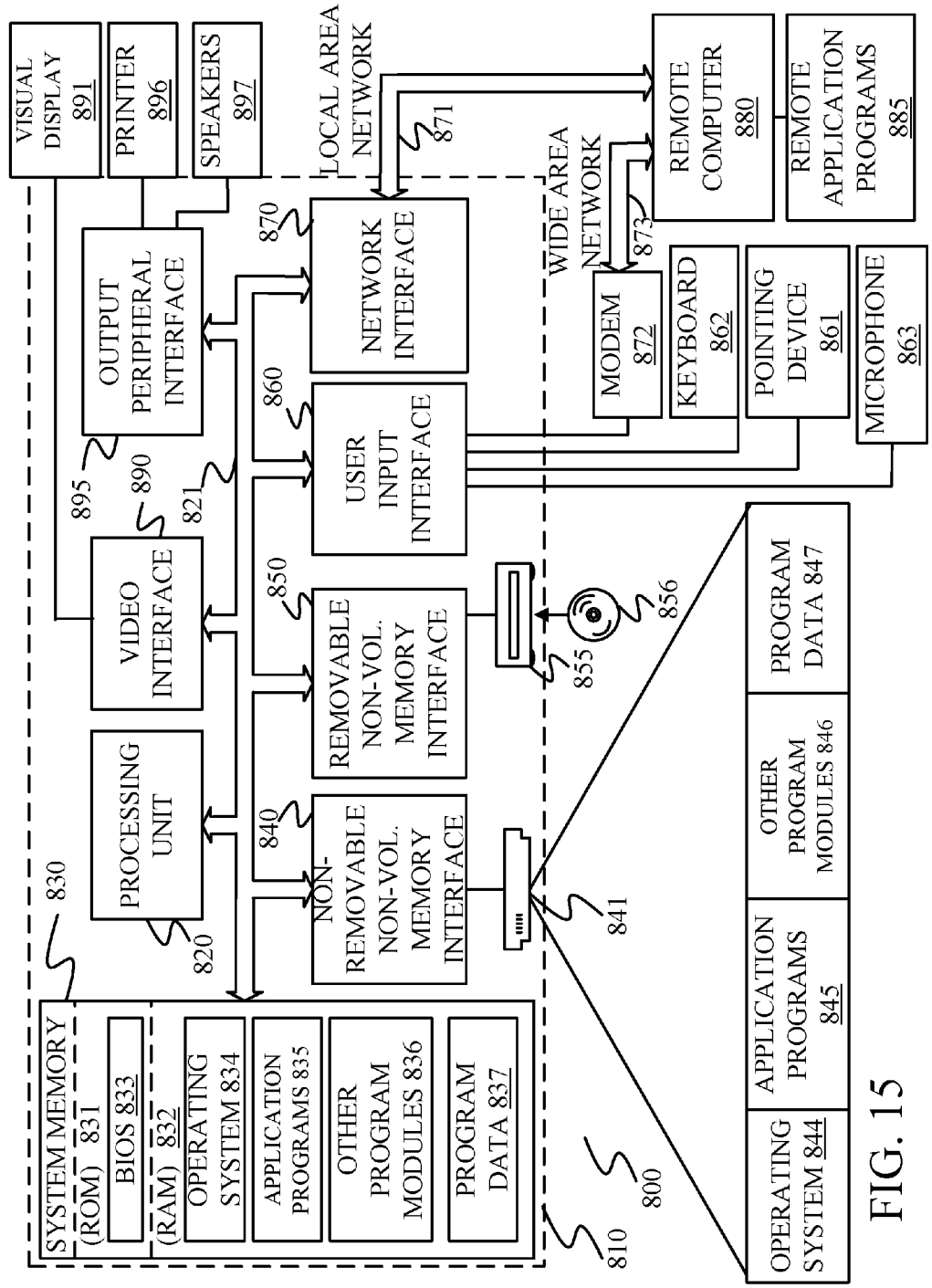
FIG. 15 is a block diagram of one example of a computing environment that can be used in the architectures shown in the previous figures.

FIG. 15 is one example of a computing environment in which elements of the system shown in FIG. 4, or parts of it, (for example) can be deployed. With reference to FIG. 15, an example system for implementing some embodiments includes a general-purpose computing device in the form of a computer 810. Components of computer 810 may include, but are not limited to, a processing unit 820 (which can comprise processor 180), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 4 can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 15 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a crop attribute sensing system, comprising:
a first flap portion having a first side with a row divider mount, and an elongate, crop engaging displaceable side, generally opposite the first side of the first flap portion, the elongate, crop engaging displaceable side of the first flap portion being displaceable relative to the first side of the first flap portion in response to engagement with a crop stalk;
a second flap portion having a first side with a row divider mount, and an elongate, crop engaging displaceable side, generally opposite the first side of the second flap portion, the elongate, crop engaging displaceable side of the second flap portion being displaceable relative to the first side of the second flap portion in response to engagement with the crop stalk; and
a displacement sensor system that senses displacement of the elongate, crop engaging displaceable sides of the first and second flap portions and generates a sensor signal indicative of the sensed displacement.

Example 2 is the crop attribute sensing system of any or all previous examples wherein the displacement sensor system comprises:
a first displacement sensor configured to sense displacement of the elongate, crop engaging displaceable side of the first flap portion and generate a corresponding first displacement signal; and
a second displacement sensor configured to sense displacement of the elongate, crop engaging displaceable side of the second flap portion and generate a corresponding second sensor signal.

Example 3 is the crop attribute sensing system of any or all previous examples wherein the elongate, crop engaging displaceable sides of the first and second flap portions are displaceable from an at-rest position and wherein the first ends are mounted to adjacent row dividers of a harvesting machine header so the elongate, crop engaging displaceable sides of the first and second flap portions are spaced apart from one another.

Example 4 is the crop attribute sensing system of any or all previous examples and further comprising:

a displacement force controller configured to control the first flap portion to vary a displacement force for displacing the elongate, crop engaging displaceable side of the first flap portion.

Example 5 is a harvesting machine header, comprising:
a plurality of row dividers spaced to travel between crop rows during a harvesting operation;
a crop engagement mechanism mounted between a pair of adjacent row dividers, the crop engagement mechanism including:
  a first flap portion having a fixed end mounted to a first row divider, of the pair of adjacent row dividers, and a displaceable end defining an elongate edge displaceable in response to engagement with a crop stalk;
  a second flap portion having a fixed end mounted to a second row divider, of the pair of adjacent row dividers, and a displaceable end defining an elongate edge displaceable in response to engagement with the crop stalk; and
  a displacement sensor system that senses displacement of the displaceable ends of the first and second flap portions and generates a sensor signal indicative of the sensed displacement.

Example 6 is the harvesting machine header of any or all previous examples wherein the displacement sensor system comprises:
  a first displacement sensor configured to sense displacement of the displaceable end of the first flap portion and generate a corresponding first displacement signal; and
  a second displacement sensor configured to sense displacement of the displaceable end of the second flap portion and generate a corresponding second sensor signal.

Example 7 is the harvesting machine header of any or all previous examples and further comprising:
  a gathering chain assembly corresponding to the first and second row dividers, each row divider having a snout portion at a first end thereof, the gathering chain assembly having a crop entrance end and a crop exit end and being mounted relative to the first and second row dividers so the crop entrance end of the gathering chain assembly is spaced from the snout portions of the row dividers.

Example 8 is the harvesting machine header of any or all previous examples wherein the first and second flap portions are mounted to the first and second row dividers at first and second mounting locations that are more closely proximate the crop entrance end of the gathering chain assembly than the snout portions of the first and second row dividers.

Example 9 is the harvesting machine header of any or all previous examples wherein the first and second mounting locations are on the row dividers and positioned between a first location on the row dividers adjacent the crop entrance end of the gathering chain assembly and a second location on the row dividers adjacent the crop exit end of the gathering chain assembly.

Example 10 is the harvesting machine header of any or all previous examples wherein the first and second mounting locations are on the row dividers and positioned substantially adjacent the crop entrance end of the gathering chain assembly.

Example 11 is the harvesting machine header of any or all previous examples wherein the displaceable ends of the first and second flap portions are displaceable from an at-rest position and wherein the fixed ends are mounted to the row dividers so the elongate edges of the first and second flap portions are spaced apart from one another.

Example 12 is the harvesting machine header of any or all previous examples wherein the elongate edges of the first and second flap portions are generally parallel with one another when in the at-rest position.

Example 13 a harvesting machine, comprising:
  a header that includes a plurality of row dividers spaced to travel between crop rows during a harvesting operation;
  a crop loss inhibitor mechanism having first and second flap portions mounted between a pair of adjacent row dividers, the first and second flap portions being displaceable to receive a crop stalk therebetween in response to relative movement of the harvesting machine and the crop stalk;
  a crop attribute sensor, coupled to the crop loss inhibitor mechanism, sensing a variable based on movement of the first and second flap portions and generating a sensor signal indicative of the sensed variable; and
  a sensor signal processing system identifying a crop attribute based on the sensor signal and generating a control signal based on the identified crop attribute.

Example 14 is the harvesting machine of any or all previous examples and further comprising:
  an effector that performs an effector function, the displacement signal processing system controlling the effector based on the control signal.

Example 15 is the harvesting machine of any or all previous examples wherein the sensor signal processing system is configured to identify crop yield as the crop attribute, the harvesting machine further comprising a controlled harvesting machine subsystem, wherein the effector comprises:
  yield monitor logic that controls the controlled harvesting machine subsystem based on the identified crop yield.

Example 16 is the harvesting machine of any or all previous examples wherein the crop attribute sensor comprises:
  a displacement sensor system that senses displacement of the first and second flap portions and generates the sensor signal indicative of the sensed displacement.

Example 17 is the harvesting machine of any or all previous examples wherein the first flap portion comprises a fixed end mounted to a first row divider, of the pair of adjacent row dividers, and a displaceable end defining a first elongate edge displaceable in response to engagement with the crop stalk and wherein the second flap portion comprises a fixed end mounted to a second row divider, of the pair of adjacent row dividers, and a displaceable end defining a second elongate edge, generally parallel to the first elongate edge, the displaceable end of the second flap portion being displaceable in response to engagement with the crop stalk.

Example 18 is the harvesting machine of any or all previous examples wherein each row divider has a snout portion at a first end thereof and further comprising:
  a gathering chain assembly corresponding to the first and second row dividers, having a crop entrance end and a crop exit end and being mounted relative to the first and second row dividers so the crop entrance end of the gathering chain assembly is spaced from the snout portions of the row dividers, wherein the first and second flap portions are mounted to the first and second row dividers at first and second mounting locations that are more closely proximate the crop entrance end of the gathering chain assembly than the snout portions of the first and second row dividers.

Example 19 is the harvesting machine of any or all previous examples wherein each row divider has a snout portion at a first end thereof and further comprising:
 a gathering chain assembly corresponding to the first and second row dividers, having a crop entrance end and a crop exit end and being mounted relative to the first and second row dividers so the crop entrance end of the gathering chain assembly is spaced from the snout portions of the row dividers, wherein the first and second mounting locations are on the row dividers and positioned, along a direction of travel of the harvesting machine, between the crop entrance end of the gathering chain assembly and the crop exit end of the gathering chain assembly.

Example 20 is the harvesting machine of any or all previous examples and further comprising:
 a displacement force controller configured to control the first flap portion to vary a displacement force for displacing the first flap portion.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A crop attribute sensing system, comprising:
 a first flap portion having a first side with a row divider mount, and an elongate, crop engaging displaceable side, generally opposite the first side of the first flap portion, the elongate, crop engaging displaceable side of the first flap portion having a distal edge that is elongate in a generally vertical direction when in an operating position and being displaceable relative to the first side of the first flap portion in response to engagement with a crop stalk;
 a second flap portion having a first side with a row divider mount, and an elongate, crop engaging displaceable side, generally opposite the first side of the second flap portion, the elongate, crop engaging displaceable side of the second flap portion having a distal edge that is elongate in the generally vertical direction and generally parallel to the distal edge of the first flap portion, and being displaceable relative to the first side of the second flap portion in response to engagement with the crop stalk; and
 a displacement sensor system that senses displacement of the elongate, crop engaging displaceable sides of the first and second flap portions and generates a sensor signal indicative of the sensed displacement.

2. The crop attribute sensing system of claim 1 wherein the displacement sensor system comprises:
 a first displacement sensor configured to sense displacement of the elongate, crop engaging displaceable side of the first flap portion and generate a corresponding first displacement signal; and
 a second displacement sensor configured to sense displacement of the elongate, crop engaging displaceable side of the second flap portion and generate a corresponding second sensor signal.

3. The crop attribute sensing system of claim 2 wherein the elongate, crop engaging displaceable sides of the first and second flap portions are displaceable from an at-rest position and wherein the first ends are mounted to adjacent row dividers of a harvesting machine header so the elongate, crop engaging displaceable sides of the first and second flap portions are spaced apart from one another.

4. The crop attribute sensing system of claim 1 and further comprising:
 a displacement force controller configured to control the first flap portion to vary a displacement force for displacing the elongate, crop engaging displaceable side of the first flap portion.

5. A harvesting machine header, comprising:
 a plurality of row dividers spaced to travel between crop rows during a harvesting operation;
 a crop engagement mechanism mounted between a pair of adjacent row dividers, the crop engagement mechanism including:
  a first flap portion having a fixed end mounted to a first row divider, of the pair of adjacent row dividers, and a displaceable end defining an elongate, generally vertical, edge that is at least two inches in length, and that is displaceable in response to engagement with a crop stalk;
  a second flap portion having a fixed end mounted to a second row divider, of the pair of adjacent row dividers, and a displaceable end defining an elongate, generally vertical, edge, generally parallel in a vertical direction to the elongate, generally vertical, edge of the first flap portion and displaceable in response to engagement with the crop stalk; and
  a displacement sensor system that senses displacement of the displaceable ends of the first and second flap portions and generates a sensor signal indicative of the sensed displacement.

6. The harvesting machine header of claim 5 wherein the displacement sensor system comprises:
 a first displacement sensor configured to sense displacement of the displaceable end of the first flap portion and generate a corresponding first displacement signal; and
 a second displacement sensor configured to sense displacement of the displaceable end of the second flap portion and generate a corresponding second sensor signal.

7. The crop attribute sensing system of claim 6 wherein the distal edge of the first flap portion and the distal edge of the second flap portion are each at least two inches in length.

8. The crop attribute sensing system of claim 7 wherein the distal edge of the first flap portion has a length that exceeds a distance from the first side of the first flap portion to the distal edge of the first flap portion and wherein the distal edge of the second flap portion has a length that exceeds a distance from the first side of the second flap portion to the distal edge of the second flap portion.

9. The harvesting machine header of claim 5 and further comprising:
 a gathering chain assembly corresponding to the first and second row dividers, each row divider having a snout portion at a first end thereof, the gathering chain assembly having a crop entrance end and a crop exit end and being mounted relative to the first and second row dividers so the crop entrance end of the gathering chain assembly is spaced from the snout portions of the row dividers.

10. The harvesting machine header of claim 9 wherein the first and second flap portions are mounted to the first and second row dividers at first and second mounting locations that are more closely proximate the crop entrance end of the gathering chain assembly than the snout portions of the first and second row dividers.

11. The harvesting machine header of claim 10 wherein the first and second mounting locations are on the row dividers and positioned between a first location on the row dividers adjacent the crop entrance end of the gathering chain assembly and a second location on the row dividers adjacent the crop exit end of the gathering chain assembly.

12. The harvesting machine header of claim 10 wherein the first and second mounting locations are on the row dividers and positioned substantially adjacent the crop entrance end of the gathering chain assembly.

13. The harvesting machine header of claim 10 wherein the displaceable ends of the first and second flap portions are displaceable from an at-rest position and wherein the fixed ends are mounted to the row dividers so the elongate edges of the first and second flap portions are spaced apart from one another.

14. The harvesting machine header of claim 13 wherein the elongate edges of the first and second flap portions are generally parallel with one another when in the at-rest position.

15. A harvesting machine, comprising:
a header that includes a plurality of row dividers spaced to travel between crop rows during a harvesting operation;
a crop loss inhibitor mechanism having first and second flap portions mounted between a pair of adjacent row dividers, the first and second flap portions each having a fixed end and a displaceable end spaced from the fixed end by a generally horizontal width, each of the first and second flap portions having a vertical height that is at least as long as the generally horizontal width of at least one of the first and second flap portions, the displaceable ends being displaceable to receive a crop stalk therebetween in response to relative movement of the harvesting machine and the crop stalk;
a crop attribute sensor, coupled to the crop loss inhibitor mechanism, sensing a variable based on movement of the first and second flap portions and generating a sensor signal indicative of the sensed variable; and
a sensor signal processing system identifying a crop attribute based on the sensor signal and generating a control signal based on the identified crop attribute.

16. The harvesting machine of claim 15 and further comprising:
an effector that performs an effector function, the displacement signal processing system controlling the effector based on the control signal.

17. The harvesting machine of claim 16 wherein the sensor signal processing system is configured to identify crop yield as the crop attribute, the harvesting machine further comprising a controlled harvesting machine subsystem, wherein the effector comprises:
yield monitor logic that controls the controlled harvesting machine subsystem based on the identified crop yield.

18. The harvesting machine of claim 15 wherein the crop attribute sensor comprises:
a displacement sensor system that senses displacement of the first and second flap portions and generates the sensor signal indicative of the sensed displacement.

19. The harvesting machine of claim 18 wherein the first flap portion comprises a fixed end mounted to a first row divider, of the pair of adjacent row dividers, and a displaceable end defining a first elongate edge displaceable in response to engagement with the crop stalk and wherein the second flap portion comprises a fixed end mounted to a second row divider, of the pair of adjacent row dividers, and a displaceable end defining a second elongate edge, generally parallel to the first elongate edge, the displaceable end of the second flap portion being displaceable in response to engagement with the crop stalk.

20. The harvesting machine of claim 19 wherein each row divider has a snout portion at a first end thereof and further comprising:
a gathering chain assembly corresponding to the first and second row dividers, having a crop entrance end and a crop exit end and being mounted relative to the first and second row dividers so the crop entrance end of the gathering chain assembly is spaced from the snout portions of the row dividers, wherein the first and second flap portions are mounted to the first and second row dividers at first and second mounting locations that are above the gathering chain assembly and more closely proximate the crop entrance end of the gathering chain assembly than the snout portions of the first and second row dividers.

21. The harvesting machine of claim 19 wherein each row divider has a snout portion at a first end thereof and further comprising:
a gathering chain assembly corresponding to the first and second row dividers, having a crop entrance end and a crop exit end and being mounted relative to the first and second row dividers so the crop entrance end of the gathering chain assembly is spaced from the snout portions of the row dividers, wherein the first and second mounting locations are on the row dividers and positioned above the gathering chain assembly and, along a direction of travel of the harvesting machine, between the crop entrance end of the gathering chain assembly and the crop exit end of the gathering chain assembly.

22. The harvesting machine of claim 15 and further comprising:
a displacement force controller configured to control the first flap portion to vary a displacement force for displacing the first flap portion.

* * * * *